United States Patent
Woodgate et al.

(10) Patent No.: US 7,821,717 B2
(45) Date of Patent: Oct. 26, 2010

(54) LENTICULAR LENS ARRAY ELEMENT

(75) Inventors: Graham John Woodgate, Henley-on-Thames (GB); Jonathan Harrold, Warwick (GB)

(73) Assignee: AU Optronics Corporation, Hsinchu (TW)

( * ) Notice: Subject to any disclaimer, the term of this patent is extended or adjusted under 35 U.S.C. 154(b) by 61 days.

(21) Appl. No.: 12/161,937

(22) PCT Filed: Jan. 23, 2007

(86) PCT No.: PCT/GB2007/000199
§ 371 (c)(1),
(2), (4) Date: Jul. 23, 2008

(87) PCT Pub. No.: WO2007/083149
PCT Pub. Date: Jul. 26, 2007

(65) Prior Publication Data
US 2009/0168187 A1  Jul. 2, 2009

(30) Foreign Application Priority Data
Jan. 23, 2006  (GB) .................................. 0601287.6

(51) Int. Cl.
G02B 27/10  (2006.01)
(52) U.S. Cl. ....................................... 359/622; 359/620
(58) Field of Classification Search .......... 359/619–624
See application file for complete search history.

(56) References Cited

U.S. PATENT DOCUMENTS 6,680,762 B2  1/2004  Fukuda et al.
6,831,787 B1 * 12/2004  Scarbrough et al. ......... 359/622
2002/0018299 A1 * 2/2002  Daniell ....................... 359/622

FOREIGN PATENT DOCUMENTS

CN  1397824  2/2003
JP  2001-133602  5/2001

OTHER PUBLICATIONS

English language translation of abstract and pertinent parts of JP 2001-133602.
English language translation of abstract of CN 1397824, date: Feb. 19, 2003.

* cited by examiner

Primary Examiner—Joseph Martinez
(74) Attorney, Agent, or Firm—Thomas, Kayden, Horstemeyer & Risley, LLP

(57) ABSTRACT

A lens element comprising: a rear substrate having a front surface provided with a surface relief having a plurality of zones each capable of providing a lens effect; a front substrate disposed in front of the rear substrate and having a rear surface provided with a surface relief having a plurality of zones each capable of providing a lens effect, the zones of the surface reliefs provided on the rear substrate and the front substrate having the same spatial arrangement over the area of the lens element; and solid or liquid, isotropic, intermediate material disposed between the front surface of the rear substrate and the rear surface of the front substrate, the intermediate material having a refractive index different from the refractive index of each of the rear substrate and the front substrate. This construction reduces the degree of Fresnel reflection which would otherwise degrade the optical performance.

39 Claims, 9 Drawing Sheets

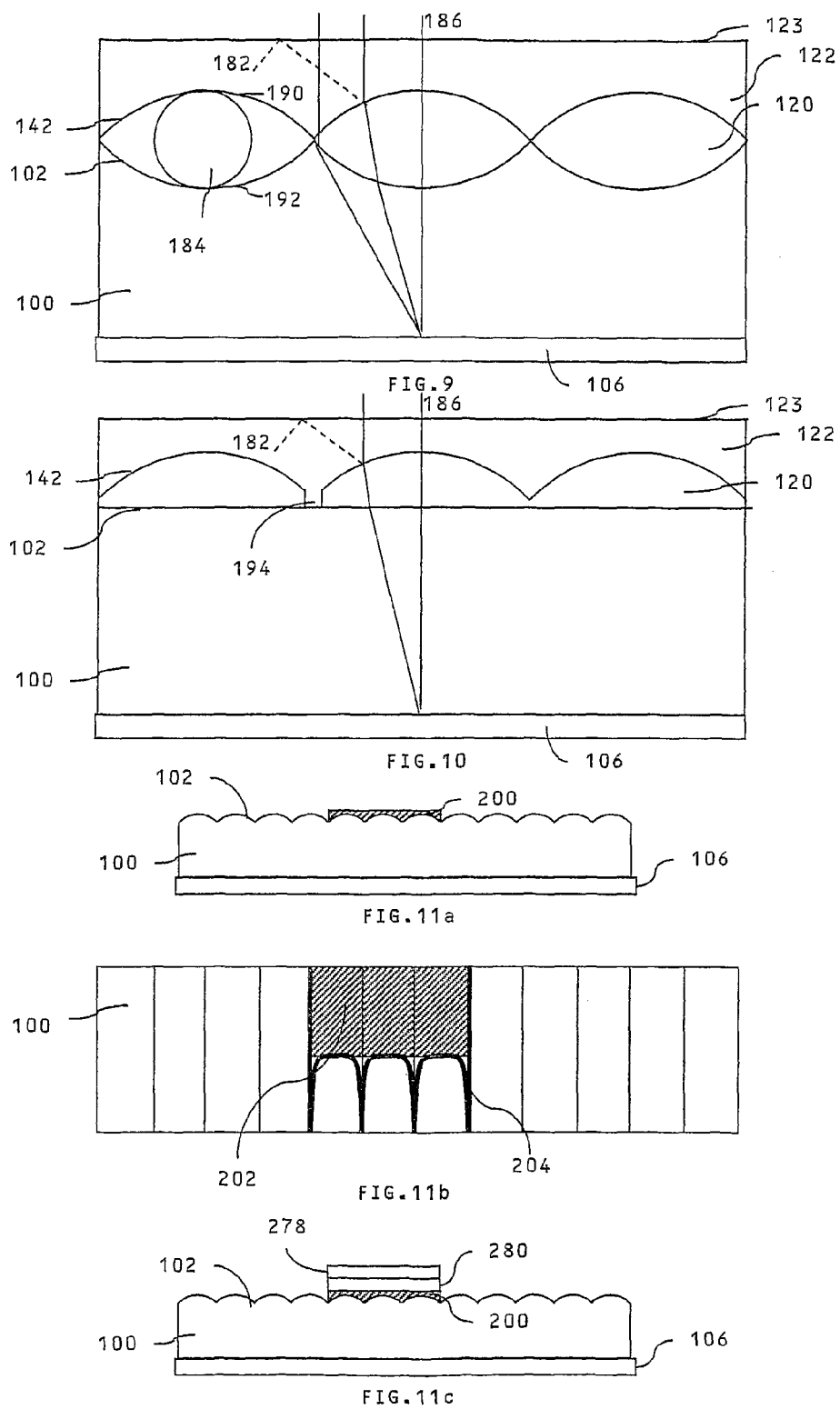

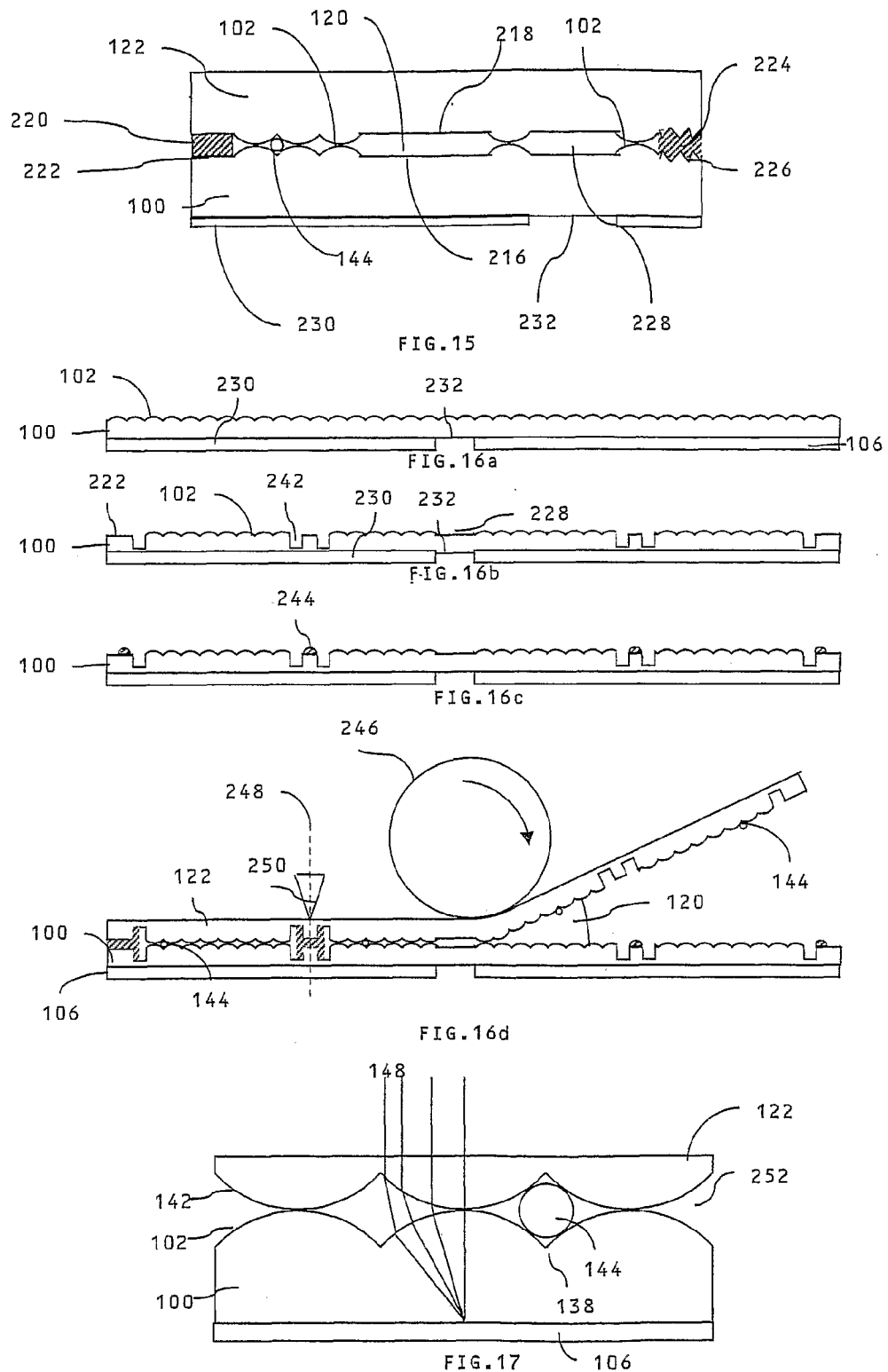

LENTICULAR LENS ARRAY ELEMENT

CROSS-REFERENCE TO RELATED APPLICATION

This application is a co-pending application which claims priority to PCT Application No. PCT/GB2007/000199, filed Jan. 23, 2007, herein incorporated by reference in its entirety.

The present invention relates to lens elements formed by a substrate having a surface provided with a surface relief capable of providing a lens effect. For example the surface relief may be shaped as an array of lens surfaces or as a Fresnel lens, depending on the application.

In one application, the lens element may form a lens array for a printed image display apparatus having plurality of printed images in which strips of each image are interlaced. In another application, the lens element may form a lens array for a display apparatus employing a spatial light modulator have an array of pixels capable of displaying interlaced images. In such applications, a lens array is in use disposed over the plurality of printed images or the spatial light modulator. The lens array directs light from each image into a respective viewing window. This can produce a number of different effects, for example providing an autostereoscopic image or a flip image.

Normal human vision is stereoscopic so that each eye sees a slightly different image of the world, and the brain fuses the images to give the sense of depth. Lenticular arrays are well known devices comprising an array of cylindrical lenses that can be used to present each eye of an observer with a separate image. An array of strips of images is positioned under the aperture of each lens. The lens directs the light from each image in a respective direction with respect to the optical axis of the lens. The individual lenses are aligned with a strip of each image, typically the pitch of the lenses being set to be slightly less than the pitch of a group of column of dots to provide viewpoint correction. As a result, each image is directed into nominal viewing windows in a nominal window plane in front of the printed image. If an observer places an eye in a viewing window, a single image can be seen across the whole of the printed image surface, because light is received from each strip of a single one of the plural printed images. The viewing angle of the lenticular print is the angle over which the observer can move while maintaining imaging of the strips of a respective printed image through each lens.

Lens arrays such as lenticular screens (with a one dimensional array of cylindrical lenses), or microlens screens (with two dimensional arrays of lenses) are typically formed at the surface of a plastic substrate by means of moulding, casting, embossing, extruding or other well known replication techniques. Desirably, the material used to fabricate the lens array has a relatively high refractive index, for example 1.57 or higher, in order to minimise the thickness of the device.

In other types of application the lens element may form a Fresnel lens for use in a variety of types of apparatus, for example a backlight apparatus for a display or a projection image display apparatus. A Fresnel lens may comprise an array of surface relief lens elements, each cooperating to produce a common optical power across the surface of the Fresnel lens.

The first aspect of the present invention is concerned with reducing the effect frontal reflections from the relief surface of such a lens element. Unfortunately the relief surface suffers from Fresnel reflections. For example a substrate of material of refractive index 1.57 in air has an on-axis Fresnel surface reflectivity of 5%. Fresnel reflections from the relief surface may be considered as specular, but for the purposes of this application the term specular reflection refers to reflections that are provided by a plane interface. Such surface reflections cause various problems depending on the application of the lens element.

As one example, in the case of a lens element providing an array of lens surfaces for a display apparatus, such surface reflections can be particularly distracting for an observer, as will be described below.

By way of comparison, a plane surface will produce a specular image of a light source, due to Fresnel reflections at the interface. The image of the light source appears to originate from a narrow range of angles across the surface. It is relatively easy to move the light source, device or observer's position to remove visibility of these reflections.

In contrast, in a lens array, the curvature of each lens of the lens array results in a range of surface angles across each of the individual lenses. An observer in front of a lens array can see a specular reflection from a light source across the part of the lens which has a tilt angle arranged to direct the light from the source to the eye. This results in the appearance of smearing of light sources across the width of the image, such that the lens surface is easily visible. As the light source is smeared, it is not easy to move the light source, device or observer's position to remove visibility of these light sources.

Visibility of the lens surface has detrimental consequences for a lens array image, including reduced image contrast; parts of the lens which show the surface reflection are observed as being separated by parts of the lens in which the underlying image can be seen, the difference in intensity creating a stripe artefact across the image, which may be distracting; a two dimensional surface is imposed on the 3D image so that image depth points which are intended to be perceived in front of the lens array plane have conflicting depth cues with the lens array plane, resulting in visual stress for the observer; reduced display brightness due to difficulty of correctly positioning light sources; and reduced colour saturation of images because of reduced brightness and contrast.

As another example, in the case of other applications the surface reflections can scatter light and thereby degrade the optical performance of the optical system. In a backlight apparatus for example, this scattering causes undesirable light losses. In a projection image display apparatus for example, this scattering causes the contrast of the image to be reduced, thus degrading device contrast and uniformity, as well as increasing the visibility of optical components in brightly lit ambient environments.

Thin film interference coatings are well known and can substantially reduce surface reflectivity. However, these coatings generally require vacuum deposition techniques, thus having a high cost. Further, for printed articles in which often large size components are required in high volume, such systems are not easily scalable. Further, the coatings are required to operate over a wide illumination angle, as described above, and are preferably required to have good mechanical endurance when deposited on low cost polymer lens materials. The lenses are preferably required to be resistant to fingerprints, while typical dielectric coatings are degraded by surface grease from fingerprints, or alternatively are required to further incorporate high cost fluorinated polymers so as to minimise surface degradation.

Low refractive index materials, for example fluorinated materials with a refractive index of 1.29 or sol-gel materials can also be used to conformally coat lenses in order to substantially reduce the volume and therefore cost of the low refractive index materials. Such a technique can reduce Fresnel reflectivity from the curved surface of a lens with a refractive index of 1.57 to approximately 2.5%. However, lenses are generally still very visible at this level, due to the high surface curvature of both lens and low index coating.

Thus, this prior art does not overcome the visibility of artefacts of frontal reflections from the relief surface in a low cost manner.

According to the first aspect of the present invention, there is provided a lens element comprising:

a rear substrate having a front surface provided with a surface relief having a plurality of zones each capable of providing a lens effect;

a front substrate disposed in front of the rear substrate and having a rear surface provided with a surface relief having a plurality of zones each capable of providing a lens effect, the zones of the surface reliefs provided on the rear substrate and the front substrate having the same spatial arrangement over the area of the lens element; and solid or liquid, isotropic, intermediate material disposed between the front surface of the rear substrate and the rear surface of the front substrate, the intermediate material having a refractive index different from the refractive index of each of the rear substrate and the front substrate.

The liquid or solid isotropic material reduces the degree of Fresnel reflection from the array of lens surfaces, as compared to an equivalent lens element employing a single substrate having a relief surface interfacing with air. In particular, the reflectivity at the lens surfaces can be greatly reduced. This is because the isotropic material will have a refractive index which is greater than that of air. The intermediate material may advantageously have a refractive index which is closer to the refractive index of the substrates than to the refractive index of air. The reduced surface reflection improves the optical performance of the lens element by reducing the problems associated with surface reflection, as set out above.

Of course the presence of the isotropic material reduces the power of the lens effect provided by the relief surface, as compared to an identical relief surface interfacing with air. However this effect is mitigated by the fact that the lens element has two relief surfaces. By providing two surface reliefs having the same spatial arrangement over the area of the lens element, the surface reliefs cooperate optically. Both relief structures have an equivalent lens effect and optical power can be obtained from both relief surfaces. Depending on the actual refractive index of the isotropic material, it is possible by design of each relief surface to provide the lens element with an equivalent optical power to lens element comprising a single relief surface interfacing with air.

The impact of Fresnel reflection may be further reduced by the front substrate having a planar front surface which cooperates with the rear substrate and isotropic material to provide total internal reflection of light at the outer surface that is normally incident on the apparatus and reflected from a portion of each lens surface. Advantageously, this apparatus can substantially reduce the non-specular surface reflectivity of the lenses of the lens array by means of total internal reflection and by means of reduction of Fresnel reflections at the lens surfaces. Further, when the front surface of the front substrate is a planar surface, it can be readily cleaned and repaired using standard techniques for plane plastic surfaces. In contrast, exposed lenticular surfaces have a tendency to trap dirt over the cusps and cannot be repaired.

In general the isotropic material may be a liquid or a solid, but the use of a liquid enables the use of low cost, low refractive index materials. Low refractive index liquids are more widely available, and less costly than low refractive index solid materials (for example a polymer or a gel).

In general, in the case of relief surfaces shaped as an array of lens surfaces, the lens surfaces may be either concave or convex, but convex lens surfaces have the advantage that it is easier to incorporate an intermediate material having a refractive index lower than the refractive index of each of the rear substrate and the front substrate to provide a positive optical power.

Advantageously alignment elements may be disposed within the intermediate material and contacting the surface reliefs. In the case of relief surfaces shaped as an array of lens surfaces the alignment elements may contact over the cusps between lens surfaces. In the case of relief surfaces shaped as a Fresnel lens alignment elements may align the surfaces by locating in the cusps between the zones of the Fresnel lens. Alignment of the lens surfaces of the two arrays is very important. Use of alignment elements is an effective way to achieve this which is nonetheless straightforward to implement practically without requiring additional mechanical positioning. The alignment elements locate easily and may be arranged to automatically locate, for example by means of fluidic self-assembly. The alignment elements also act as a spacer element to hold the substrates at the desired separation and can be used to provide adhesive contact between the two substrates.

The alignment elements may advantageously have a circular cross section, for example being such as a sphere or fibre (such as a wire). For example, the alignment elements may be provided by glass, resin or polymer balls which may be sprayed or otherwise dispersed on to one of the substrates, or fibre or the like which may be laid on one of the substrates.

The outer surface of the alignment elements may be adhesive by which the alignment elements are adhered to the lens surfaces. This assists in adhering the two substrates together. As the alignment elements may be dispersed this can provide adhesion across all the area of the substrates. This assists in preventing separation of the substrates particularly when the display apparatus is flexed. The adhesive may be a light curable adhesive, for example a UV curable adhesive, a thermally cured adhesive or an adhesive curable by means of pressure.

Alternatively, the alignment elements may further enable wetting of the entire area of the lens array by preventing van der Waals attraction of the first to the second substrate. The alignment elements therefore may not require an adhesive.

Advantageously, if the alignment elements are left within the display apparatus the alignment elements may have a refractive index similar to that of the intermediate material. For example, the alignment elements may be formed from fluorinated polymer materials.

In the case of the alignment elements being fibres, the fibres may extend beyond the substrates in the alignment process and may be removed by pulling the fibres out after the two substrates have been attached. In this case the alignment elements are absent from the end product.

Advantageously, the front substrate has a planar front surface. This assists in providing total internal reflection as described above, and also allows the outer surface of the apparatus to be cleaned and repaired using standard techniques for plane plastic surfaces. In contrast, exposed lenticular surfaces have a tendency to trap dirt over the cusps and cannot be repaired. The front surface may advantageously be attached to other substrates by means of lamination for example. This reduces the overall Fresnel losses in the system. Prior art devices do not allow attachment to other devices without the loss of the optical function.

The form of the relief surface depends on the application of the lens element.

For some applications, the front surface of the rear substrate is provided with a surface relief shaped as an array of lens surfaces, and the rear surface of the front substrate is provided with a surface relief shaped as an array of lens surfaces aligned coaxially with the array of lens surfaces of the rear substrate. This type of lens element may be provided in a directional printed image display apparatus in front of a plurality of printed images, successive strips of each image being interlaced with each other in a regular order, or may be provided in a display apparatus comprising a spatial light modulator having an array of pixels capable of displaying a plurality of images with successive strips of each image interlaced with each other in a regular order. In a display apparatus, the arrays of lens surfaces of the rear substrate and the front substrate may cooperate to direct light from the plurality interlaced images into respective nominal viewing windows.

In the case of a printed image display apparatus, in many applications, it would be desirable to show both 2D regions, and 3D regions. Lens arrays reduce the resolution of the printed image because a plurality of printed images are interlaced with each other. As a result, it is difficult to clearly display high resolution objects, for example text. Further it can be desirable to produce regions of a lenticular image through which the lenticular optical function is removed, and items behind the element are visible. For example, in a packaging application, it can be desirable to see the package contents through a lenticular label. To tackle these problems, display apparatuses in accordance with the first or second aspect of the invention can incorporate the following features.

A first option is that, in at least one area of the display apparatus, the front surface of the front substrate has printed thereon a single printed image extending across the entirety of the at least one area of the display apparatus. The image on the front surface covers the lens surfaces and hence masks the light from the printed images which is directed by the lens surfaces. Therefore the image on the front surface is a two dimensional image that suffers from no loss of resolution as a result of the lens surfaces.

It is a particular advantage of the front substrate having a planar front surface that such printing is straightforward to perform. Such a surface can be conveniently printed with high image resolution and quality. In particular, it is possible to use the same printing process as used to print the plurality of interlaced images. In particular it is not necessary to treat the surface relief lens which can introduce problems. In contrast, prior art display apparatuses having a surface relief on the outer surface have the problem that it is difficult to print on the front surface with high resolution.

Further, the front and rear surfaces can be conveniently printed prior to device assembly. Further, 2D and 3D regions can be combined such that a directional image can be seen through a high resolution 2D image.

A second option is that, in at least one area of the display apparatus, the front surface of the rear substrate and the rear surface of the front substrate are each covered by a material having a refractive index matched to the refractive index of the respective substrate, and said plurality of printed images are replaced by a single printed image extending across the entirety of the at least one area of the display apparatus.

The effect of the lens surfaces is removed in a certain area of the display apparatus by the index-matched material, thereby allowing the display of a two dimensional image that suffers from no loss of resolution as a result of the lens surfaces.

The index-matched material may be a clear varnish or an adhesive which may be printed by means of screen printing, flexography, lithography or other known printing technique.

The amount of adhesive delivered to the surface may advantageously be controlled to substantially fill the cusps of the lens, while not substantially overcoating the peaks of the lens. The adhesive may be printed in glue tracks of appropriate thickness and width which may be calibrated to provide optimum surface finish in the 2D regions.

A third option is that, in at least one area of the display apparatus, the front surface of the rear substrate and the rear surface of the front substrate are each modified to be planar, and said printed images are replaced by a single printed image extending across the entirety of the at least one area of the display apparatus.

The effect of the lens surfaces is removed in a certain area of the display apparatus by the modification, thereby allowing the display of a two dimensional image that suffers from no loss of resolution as a result of the lens surfaces.

The modification of surface may be performed by the application of heat and/or pressure. Advantageously, the application of heat and/or pressure to modify the surface can minimise the modification to adjacent lenses. Therefore, such a system does not require careful control of glue during the fabrication process, and the position of the surface modification can be carefully controlled.

Advantageously, the modified surface need not be perfectly modified. The visibility of artefacts from a non-perfect surface will be mainly due to surface reflections and scatter from defects in the surface, rather than from variation of optical power of the surface. Thus, the reduction in reflectivity achieved by the liquid or other intermediate material further serves to substantially reduce the visibility of non-perfectly modified features.

Further, the edge seal region can be modified, either to provide a flat region with substantially no optical power, or a 'keyed' region with microscopic features to enhance the adhesion of the edge seal material to the front and rear substrates. The refractive index of the seal therefore does not have to be perfectly matched to the refractive index of the lens material to remove the lens effect. The edge region can also be modified so as to prevent the flow of edge sealant onto the lens area during the sealing process, thus providing a seal with high uniformity.

In fact, the second and third options can be applied to remove the effect of an array of lens surfaces in any type of directional printed image display apparatus even if not in accordance with the present invention.

A second aspect of the present invention is concerned with the optical performance of a lens array in a printed image display apparatus.

In many applications, for example providing autostereoscopic 3D printed images such as labels and packaging, it is desirable to reduce the thickness of the lenticular device. It would be desirable to maximise the pitch of the lens array, such that the tolerance of printing onto the rear of the lens is relaxed as much as possible.

However, if the thickness is reduced, the numerical aperture of the lens increases, and thus the sag of the lens must be increased, to maintain the imaging properties of the lens. Increasing sag beyond values currently used is generally undesirable because of the increase of aberrations created, as well as the difficulty of manufacturing the surfaces reliably. Non-spherical surfaces are well known in the art for improving on-axis device performance for higher numerical apertures. However, the off-axis performance of the lens is degraded and lens arrays incorporating non-spherical surfaces can be difficult to manufacture. Thus, existing lens designs do not generally allow substantial increases in numerical aperture of lens arrays.

A further disadvantage of thin lens arrays is that they have a tendency to tear along the line of lens cusps. Desirably, lens arrays should be stabilised.

According to the second aspect of the present invention, there is provided a directional printed image display apparatus comprising:

a plurality of printed images, successive strips of each image being interlaced with each other in a regular order;

a rear substrate disposed in front of the printed images and having a front surface shaped to provide an array of lens surfaces;

a front substrate disposed in front of the rear substrate and a rear surface shaped to provide an array of lens surfaces aligned coaxially with the array of lens surfaces of the rear substrate; and intermediate material disposed between the array of lens surfaces of the rear substrate and the array of lens surfaces of the front substrate, the intermediate material having a refractive index different from the refractive index of each of the rear substrate and the front substrate, the arrays of lens surfaces of the rear substrate and the front substrate cooperating to direct light from each image into a respective nominal viewing window.

As the arrays of lens surfaces of the rear substrate and the front substrate cooperate, together they provide a higher optical power than a single array of lens surfaces. The increased power achievable gives a number of advantages.

The increased optical power may be utilised to provide a short back working distance between the lens surfaces and the printed images. This can provide a lens array which is thinner overall than a lens array formed on a single substrate. This is because the distance between the printed images and the array of lenses of the rear substrate is set based on the focal length of the combination of both arrays of lenses.

For example, an apparatus employing a single 140 lpi lens array may have a thickness of 320 µm when formed in PETG whereas an apparatus of the present invention incorporating two lenses surfaces of the same power as a 140 lpi lens array may have a thickness of 210 µm by arranging the second substrate to have a thickness of 50 µm, for an intermediate material comprising air. The reduced thickness is advantageous in itself but also reduces the weight of the apparatus.

The reduced thickness is greatest if the front substrate is arranged to be thinner than the rear substrate. However, that is not essential. One alternative is that the two substrates are identical. This allows as single source to be used so that the two arrays of lenses are matched in pitch and have dimensional stability.

The increased optical power increases the viewing angle of the directional image. Advantageously a larger viewing angle increases the range of angles over which an image for example an autostereoscopic image can be seen, and relaxes the alignment tolerance of the image with respect to the lens axis, so that the central viewing position is orthoscopic.

A further advantage is that the apparatus is effectively a laminate sandwich of the two substrates, and so has reduced tendency to, tear during handling and operation.

In general, each array of lens surfaces may be either concave or convex, but convex lens surfaces have the advantage that it is easier to incorporate an intermediate material having a refractive index lower than the refractive index of each of the rear substrate and the front substrate to provide a positive optical power.

Another advantage of convex lens surfaces is that it enables the use of alignment elements disposed within the intermediate material and contacting the lens surfaces of the array of the rear substrate and the lens surfaces of the array of the front substrate over the cusps between lens surfaces. Alignment of the lens surfaces of the two arrays is very important. Use of alignment elements locating over the cusps between the lens surfaces is an effective way to achieve this which is nonetheless straightforward to implement practically without requiring additional mechanical positioning. The alignment elements locate easily over the cusps and may be arranged to automatically locate, for example by means of fluidic self-assembly. The alignment elements also act as a spacer element to hold the substrates at the desired separation and can be used to provide adhesive contact between the two substrates with artefacts as described above. Further, it is not possible to display high resolution 2D images on the front surfaces of the prior art lenses. Further, it is difficult to obtain optically uniform regions by overcoating with an optically clear material in which the device can be made transparent.

Thus, further according to the second aspect of the invention, there is provided a method of manufacturing a directional printed image display apparatus, the method comprising:

providing two substrates each having a surface shaped to provide an array of convex lens surfaces;

aligning the two substrates, with said surfaces shaped to provide an array of lens surfaces facing one another and aligned coaxially, and with an intermediate material disposed therebetween, the intermediate material having a refractive index lower than the refractive index of each of the two substrates, by arranging alignment elements within the intermediate material to contacting the lens surfaces of the array of each of the two substrates over the cusps between lens surfaces, and attaching the two substrates together; and providing a plurality of printed images behind the two substrates with successive strips of each image being interlaced with each other in a regular order and with a strip of each image aligned with respective lenses of the two substrates.

A third aspect of the invention is concerned with reducing the impact on the viewer of frontal reflections from the lens surface of a lens array of a printed image display apparatus. Unfortunately a lens array suffers from Fresnel reflections from the lens surfaces. For example a lens array of material of refractive index 1.57 in air has an on-axis Fresnel surface reflectivity of 5%. Fresnel reflections from lens surfaces may be considered as specular, but for the purposes of this application the term specular reflection refers to reflections that are provided by a plane interface.

For lens arrays, surface reflections can be particularly distracting for an observer, as will be described below.

By way of comparison, a plane surface will produce a specular image of a light source, due to Fresnel reflections at the interface. The image of the light source appears to originate from a narrow range of angles across the surface. It is relatively easy to move the light source, device or observer's position to remove visibility of these reflections.

In contrast, in a lens array, the curvature of each lens of the lens array results in a range of surface angles across each of the individual lenses. An observer in front of a lens array can see a specular reflection from a light source across the part of the lens which has a tilt angle arranged to direct the light from the source to the eye. This results in the appearance of smearing of light sources across the width of the image, such that the lens surface is easily visible. As the light source is smeared, it is not easy to move the light source, device or observer's position to remove visibility of these light sources.

Visibility of the lens surface has detrimental consequences for a lens array image, including reduced image contrast; parts of the lens which show the surface reflection are observed as being separated by parts of the lens in which the underlying image can be seen, the difference in intensity creating a stripe artefact across the image, which may be distracting; a two dimensional surface is imposed on the 3D image so that image depth points which are intended to be perceived in front of the lens array plane have conflicting depth cues with the lens array plane, resulting in visual stress for the observer; reduced display brightness due to difficulty of correctly positioning light sources; and reduced colour saturation of images because of reduced brightness and contrast.

Thin film interference coatings are well known and can substantially reduce surface reflectivity. However, these coatings generally require vacuum deposition techniques, thus having a high cost. Further, for printed articles in which often large size components are required in high volume, such systems are not easily scalable. Further, the coatings are required to operate over a wide illumination angle, as described above, and are preferably required to have good mechanical endurance when deposited on low cost polymer lens materials. The lenses are preferably required to be resistant to fingerprints, while typical dielectric coatings are degraded by surface grease from fingerprints, or alternatively are required to further incorporate high cost fluorinated polymers so as to minimise surface degradation.

Low refractive index materials, for example fluorinated materials with a refractive index of 1.29 or sol-gel materials can also be used to conformally coat lenses in order to substantially reduce the volume and therefore cost of the low refractive index materials. Such a technique can reduce Fresnel reflectivity from the curved surface of a lens with a refractive index of 1.57 to approximately 2.5%. However, lenses are generally still very visible at this level, due to the high surface curvature of both lens and low index coating.

Thus, this prior art does not overcome the visibility of artefacts of frontal reflections from the curved surfaces of lens arrays in a low cost manner with known materials.

According to the third aspect of the present invention, there is provided a directional printed image display apparatus comprising:

a plurality of printed images, successive strips of each image being interlaced with each other in a regular order;

a rear substrate disposed in front of the printed images;

a front substrate disposed in front of the rear substrate and having a planar front surface, the surface of one of the front substrate or the rear substrate, which surface faces the other of the front substrate or the rear substrate, being shaped to provide an array of lens surfaces which direct light from each image into a respective nominal viewing window; and a liquid or solid isotropic material contained between the rear substrate and the front substrate, the liquid having a refractive index which is different from the refractive index of said one of the front substrate or the rear substrate and which is greater than the refractive index of air.

The liquid or solid isotropic material, having a refractive index which is greater than that of air, reduces the degree of Fresnel reflection from the array of lens surfaces, as compared to a display apparatus employing a single substrate having lens surfaces interfacing with air. In particular, the reflectivity at the lens surfaces can be greatly reduced. The impact of Fresnel reflection is further reduced by the front substrate having a planar front surface which cooperates with the rear substrate and isotropic material to provide total internal reflection of light at the outer surface that is normally incident on the apparatus and reflected from a portion of each lens surface. Advantageously, this apparatus can substantially reduce the non-specular surface reflectivity of the lenses of the lens array by means of total internal reflection and by means of reduction of Fresnel reflections at the lens surfaces.

Further, the front surface of the front substrate can be readily cleaned and repaired using standard techniques for plane plastic surfaces. In contrast, exposed lenticular surfaces have a tendency to trap dirt over the cusps and cannot be repaired. The front surface can be printed on to provide a high resolution 2D image. The lens regions can be overcoated to provide transparent regions of lens with low residual visibility of artefacts from non-uniform coating of the lens.

Furthermore the use of a liquid as the isotropic material enables the use of low cost, low refractive index materials. Low refractive index liquids are more widely available, and less costly than low refractive index solids or gel materials.

According to a fourth aspect of the present invention, there is provided a directional printed image display apparatus comprising:

a plurality of printed images, successive strips of each image being interlaced with each other in a regular order; and a substrate disposed in front of the printed images and having a planar rear surface and a front surface shaped to provide an array of lens surfaces which direct light from each image into a respective nominal viewing window, wherein, in at least one area of the display apparatus, the front surface of the substrate is covered by a material having a refractive index matched to the refractive index of the substrate and said printed images are replaced by a single printed image extending across the entirety of the at least one area of the display apparatus.

In all the aspects of the present invention, the surface profile of the lens surfaces when an array of lens surfaces is used may be cylindrical or may have curvature in two dimensions, and may have a spherical or aspherical surface form.

To allow better understanding, an embodiment of the present invention will now be described by way of non-limitative example with reference to the accompanying drawings, in which:

FIG. 9 shows concave lenses in a low reflectivity double lens array;

FIG. 10 shows integrated spacer elements;

FIG. 11a shows in cross section an overcoated lens;

FIG. 11b shows in plan view an overcoated lens;

FIG. 11c shows a further display apparatus employing a single substrate 100 as shown in FIG. 1.

FIG. 15 shows a dual lens device with edge sealing, 2D, 3D and transparent regions;

FIG. 16 shows one method for fabrication of printed image display apparatus of the present invention;

FIG. 17 shows a reduced thickness lens array;

The various arrangements described below include several elements in common. Common elements are given the same reference numerals. For brevity, a description of common elements is not repeated but any comments about an element apply to all embodiments in which it is present.

There will first be described directional printed image display apparatuses employing a lens element in accordance with the present invention.

Figure 1:
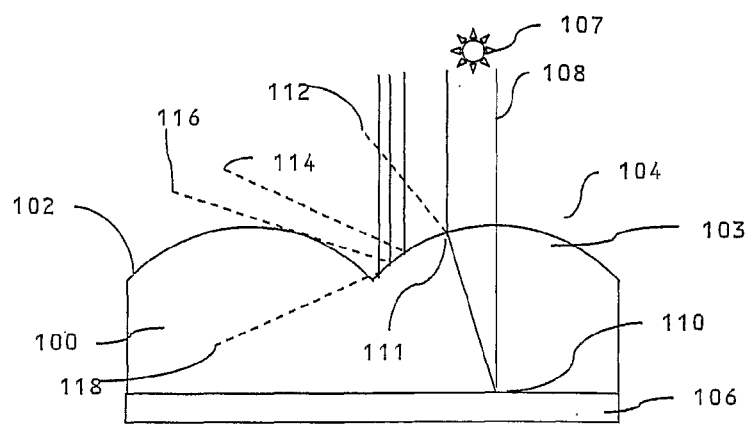
FIG. 1 shows a prior art lens print.

A directional printed image display apparatus employing a known type of lens array is shown in FIG. 1. A lens element comprises a substrate 100 of which the front surface 102 is provided with a surface relief shaped as an array of cylindrical lens surfaces. The front surface 102 forms an interface between the substrate 100 and air 104. Thus each of the lens surfaces may be considered as a zone of the surface relief which provides a lens effect, and the lens element forms a lens array.

The term "cylindrical" as used herein has its normal meaning in the art and includes not only strictly spherical lens shapes but also aspherical lens shapes. The curvature of the lenses is set substantially so as to produce an image at the window plane. As the lenses collect the light in a cone and distribute it to the windows, lenticular displays have the full brightness of the base panel.

A surface 106 has printed information formed on it and is positioned against the rear surface of the substrate 100.

Figure 6:
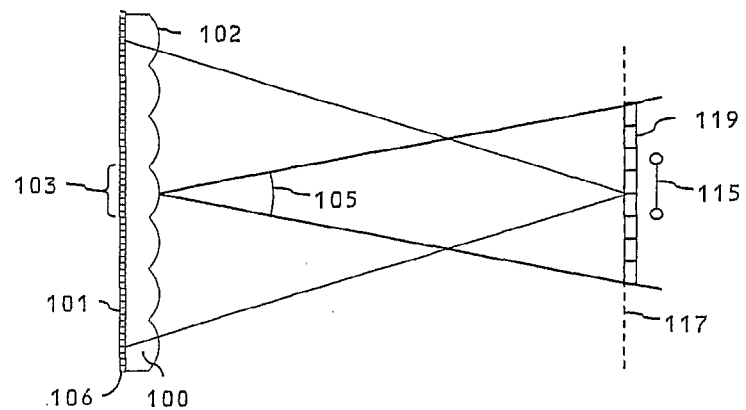
FIG. 6 shows the generation of viewing windows.

The operation of a lens array as a directional distribution modifying device is well known and is shown in FIG. 6. Incident light rays from an external light source pass through the surface 102 onto the surface 106, are focussed on to a point 110 so as to illuminate the image plane of the device. The light rays are scattered by the printed image at the surface 106 and pass back through the surface 102 to an observer (not shown). Lens array prints rely on reflected light and in that case it is beneficial to front illuminate the arrays, as opposed to lens array transparencies which can be rear illuminated.

Frontal reflections from the array are an important influence on the image quality. The reflectivity function of a lens array for an observer positioned directly in front of an array can be considered by examining the reflected directions of collimated beam 108 of white light falling normally onto the plane of the lens array. Typical plastics for substrate 100 such as PETG from Eastman Chemical may have a refractive index of 1.57. At the centre of the lens aperture 103, Fresnel reflections cause 5% of the incident light to be reflected back to the observer. However, as the light beam position is moved across the aperture 103 of the lens, the reflected angle of the Fresnel reflection increases, because of the increasing surface tilt and so the amplitude of the Fresnel reflectivity also increases. Thus rays 112, 114, 116 and 118 are generated by reflections at different points across a given lens aperture, each with a different amplitude depending on the surface tilt.

To consider the surface visibility, a light source positioned along ray 112 will be reflected from the lens at position 111 to an observer positioned normal to the lens array. Across any lens, the observer will see light sources positioned over a wide range of angles, each light source being seen at a different point across the aperture of the lens. This results in a smearing of the reflection of light from the light sources across the front of the lens array, and makes the front surface highly visible. Lens surface visibility is undesirable as described above.

The substrate 100 may have some small amount of residual birefringence as typical of many polymer films. For the purposes of the present invention, the substrate is assumed to have a single isotropic refractive index and produce substantially the same directional distribution for light of all polarisation states.

Figure 5:
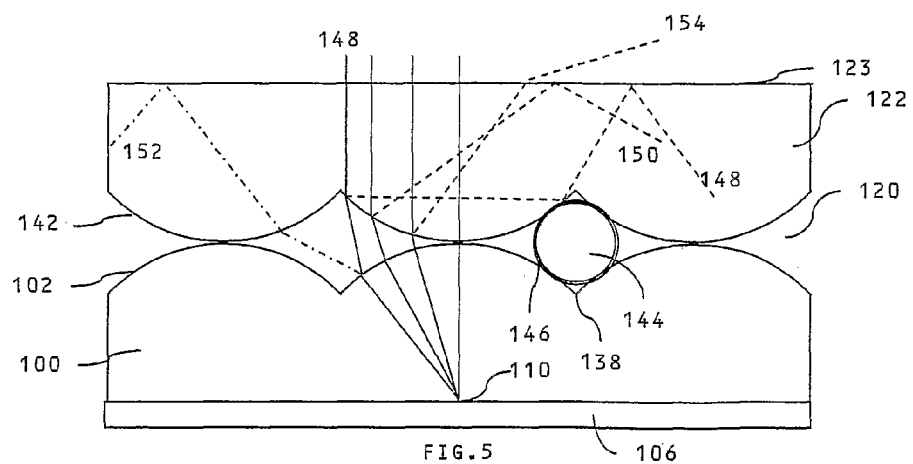
FIG. 5 shows a low reflectivity double lens array.

A directional printed image display apparatus in accordance with the first aspect of the invention is shown in FIG. 5 and comprises a lens element consisting of: a rear substrate 100, a front substrate 122 disposed in front of the rear substrate 100, and an intermediate material 120 disposed between the rear substrate 100 and the front substrate 122.

The rear substrate 100 has the same construction as in the apparatus shown in FIG. 1 and described above. The front surface 102 of the rear substrate 100 is provided with a surface relief shaped as an array of cylindrical lens surfaces. The rear surface of the rear substrate 100 is planar. The front surface 102 may be formed by means of embossing, casting, extruding, moulding or other known micro-optic fabrication or replication technology.

The substrate 100 is formed of solid isotropic material. The material of the substrate 100 may comprise a unitary piece of material for example a plastic, such as a thermoplastic material, or may comprise a first plane substrate upon which a lens structure in a second material is formed, for example by light-curing polymer on a plane substrate. The material of the substrate 100 may be a polymer which has a refractive index which is in the range 1.46-1.6, typically in the range 1.50-1.58.

A surface 106 has printed information printed on it and is positioned against the rear surface of the rear substrate 100. The surface 106 may comprise the rear surface of the lens array, in which ink is formed directly on the planar surface of the substrate 100. Alternatively, the surface 106 may comprise a separate image carrier substrate having printed information printed on it and which is brought in contact with the rear of the rear substrate 100.

The printed surface 106 may be a reflective image for example comprising further backing layers, or layers of white ink so as to allow light to be reflected from the ink surface. Alternatively, the printed surface 106 may be a transparency image, for example illuminated in use by a backlight.

The front substrate 122 has a rear surface 142 provided with a surface relief shaped as an array of cylindrical lens surfaces repeating at the same pitch as, and coaxially aligned with the lens surfaces of the front surface 102 of the rear substrate 100. Thus the zones of the surface reliefs of the two substrates 100, 122 have the same spatial arrangement over the area of the lens element. The curvature of the surface reliefs of the two substrates 100, 122 may however be different. The front substrate 122 is formed of a solid isotropic material and the comments above about possible materials and construction for the rear substrate 100 apply equally to the front substrate 122.

The front substrate 122 has a front surface 123 which is substantially planar In the context of the present invention, planar may refer to surfaces which are substantially flat on the scale of the pitch of the lens surfaces of surfaces 102 and 142. Such planar surfaces may additionally incorporate some antiglare surface structure so as to reduce the visibility of the reflection of ambient light sources from the planar surface. Such structures may for example be a roughened surface, a diffractive surface or a fine pitch lenticular surface.

The intermediate material 120 is a solid or liquid isotropic material having a refractive index different from the refractive indexes of the rear substrate 100 and the front substrate 122. Thus each lens surface of the rear substrate 100 and each lens surface of the front substrate 122 provides an equivalent lens effect.

The printed information on the surface 106 is a plurality of images, strips of the images being interlaced in a regular order. The plural images may be autostereoscopic images, that is respective pairs of images directed to respective eyes of a viewer to cause perception of a three dimensional image, or flip images, that is directional images in which a different image is seen from a different direction. Flip images are similar in nature to autostereoscopic images, except that the images are not formed from a stereo sequence of images. The lens axes of flip images are often aligned horizontally compared to the vertically aligned lenses of autostereoscopic images. Alternatively, the images could be of any other form suitable for being directed into respective viewing windows.

In general, there could be any plural number of images, although there are typically at least eight. The lens surfaces of the front surface 102 of the rear substrate 100 and the lens surfaces of the rear surface 142 of the front substrate 122 both repeat at a predetermined pitch substantially equal to the pitch of the groups 103 of strips 101, that is the pitch of the strips 101 of a single one of the printed images on surface 106 (although in fact slightly less than equal by an amount effective to provide viewpoint correction). Thus each lens surface of the rear substrate 100 and each lens surface of the front substrate 122 are aligned coaxially with respect to each other. Lens surfaces aligned coaxially are defined as having substantially parallel axes, and aligned optical apertures. In practice, this means that the cusps of the lens surfaces are also aligned. Further the lens surfaces of the substrates 100 and 122 are aligned with one group 103 of strips 101 of each printed image. Consequently, the lens surfaces of the rear substrate 100 and the front substrate 122 cooperate to direct light from each of the printed images on surface 106 into respective nominal viewing windows 119 in a nominal viewing plane 117.

FIG. 6 shows in plan view the optical output of a printed image display apparatus. A printed surface 106 is formed from groups 103 of strips 101 of dots, each strip comprising either one line of dots or plural lines of dots. There may advantageously be a gap between each strip 101. Each group 103 typically comprises between six and twenty strips. Each strip 101 of dots contains the data from one strip 101 of a single one of the plural printed images. The lens array, shown here for ease of explanation as a single lens array substrate 100 and surface 102 directs each of the strips 101 in a different direction into a respective viewing window. The viewing angle 105 is determined by the angular extent of the light from the group 103 of strips. In practice the viewing angle 105 is reduced because of the optical characteristics of the lens 100, 102. The pitch of the group 103 of strips is set slightly larger than the pitch of the lenses of the lens surface 102, so that view point correction is achieved. This results in viewing windows 119 formed at a window plane 117. One eye of an observer 115 placed in a single window in the window plane will see a single one of the plural images across the whole of the printed image display.

In an autostereoscopic image, the strips 101 and the lens surfaces of the surface 102 may be arranged vertically in columns, whereas in a flip image they may be arranged horizontally or vertically.

The cooperation of the lens surfaces of the rear substrate 100 and the front substrate 122 serves to increase the optical power by comparison with just a single lens surface being provided. Rays 108 normally incident on the plane surface undergo refraction at surfaces 142 and 102, to provide a focus at the position 110 at the image surface 106. Fresnel reflections occur at each surface 142 and 102. At the surface 142, total internal reflection may also occur as shown by ray 148, which may undergo total internal reflection at the outer surface 123, or may be transmitted through the outer surface, such that a light source can be imaged to the observer's eye from the lens surface. Fresnel reflections at the lens surfaces 142,102 can propagate along rays 150,152 by total internal reflection, or ray 154 can refract through surface 123 to a light source, such that the light source can be seen as reflected from the lens surface by an observer. The present apparatus works in the central viewing lobe formed by the imaging of a first group 103 of strips. In adjacent viewing lobes in which a lens image light from an adjacent group of strips, light reflected from the image surface 106 may pass through a first lens of the surface 102, and two lenses of the surface 142, creating errors in the output windows. However, at the large viewing angles of typical printed image display apparatus, the lens aberrations become significant, so that the visibility of the degradation may be limited.

The increased power can reduce the overall thickness of the display apparatus which is beneficial in itself and increases the viewing angle 105. In order to increase the viewing angle 105 of low reflectivity lenses, it is not desirable and often not possible to increase radius of curvature adequately to increase optical power, as the lenses in air are typically designed to provide a best compromise between optical power and aberrations. Increasing the lens to image separation serves to reduce the viewing angle 105 of the printed device which can also be disadvantageous. For example, this may tighten the lateral alignment tolerance of the printed image with respect to the lens array.

In this display apparatus, the front substrate 122 and the rear substrate 100 are identical, allowing the use of a common supply stock of materials which in turn provides the necessary similarity in the pitch of the lens surfaces of surfaces 102 and 142 to a high degree of tolerance. In this context, identical means that the lens surfaces of surfaces 102 and 142 have substantially the same radius of curvature, and pitch, and that the substrates 122 and 100 have substantially the same refractive index and thickness. The sizes of the substrates 122 and 100 may be different, for example to enable suitable bonding, because this does not affect the optical performance.

The lens surfaces of surfaces 102 and 142 of FIG. 5 generally have the same pitch. However, if there is a small separation between the principal planes of the two lens surfaces, a small difference in pitch may be incorporated so as to allow for view point correction of the surface separation.

Typically the intermediate material 120 has a refractive index lower than the substrates 100 and 122. This facilitates the choice of suitable materials for the intermediate material 120 and the substrates 100 and 122. In this case, the lens surfaces of the surfaces 102 and 142 are convex.

The intermediate material 120 could be air which is in accordance with the second but not the first aspect of the present invention. This provides for simplicity of manufacture but suffers from the disadvantage of Fresnel reflection occurring at the lens surface of each of the rear substrate 100 and the front substrate 122. However, as the lens surfaces are not exposed, it may be possible to use anti-reflective measures that would not generally be considered acceptable because of their susceptibility to damage, for example fluorinated polymer coatings or moth-eye coatings or surface finishes. The further surface reflectivity reduction can be used in combination with an air gap or a material with an intermediate refractive index. Thus, the present invention can optimise the visibility of surface reflection.

The intermediate material 120 may be another gas such as nitrogen which again is in accordance with the second but not the first aspect of the present invention. The gas may be dried prior to sealing the assembly.

Advantageously, the intermediate material 120 is a solid or a liquid having a refractive index greater than air, and different from the rear substrate 100 and the front substrate 122. In this case, the intermediate material 120 serves to reduce the Fresnel reflectivity at the lens surface of each of the rear substrate 100 and the front substrate 122. For example the liquid intermediate material 120 may have a refractive index in the range 1.29-1.42 and the rear substrate 100 and the front substrate 122 may have respective refractive indexes in the range 1.46-1.6. The reflectivity may be minimised by selecting an intermediate material 120 having a refractive index closer to that of the rear substrate 100 and the front substrate 122 than to air.

If the intermediate material 120 is a solid, it is typically a low index polymer such as a fluorinated polymer. Alternatively the intermediate material 120 is a gel.

However, particular advantage is achieved if the intermediate material 120 is a liquid. Use of a liquid as the intermediate material 120 enables the use of low cost, low refractive index materials.

One possibility is that the intermediate material 120 may comprise water. Water is a particularly advantageous material to use as it has high optical transmission, low refractive index and has very low cost. Water has a nominal refractive index of 1.33.

Advantageously, the intermediate material 120 may be a low index oil such as a silicone oil. Silicone oils with a refractive index lower than typical materials for the front substrate 122 and rear substrate 100, for example less than 1.4, are readily available. An example of a suitable oil is a Dow Corning 200 fluid with the viscosity of the fluid being for example between 5 and 1000 centistokes.

Typical lens substrates 100,122 which may be fabricated from polymer materials such as PETG are permeable to gases such as oxygen and nitrogen and to water. Such devices are thus prone to the generation of bubbles and will eventually empty. Oil filled devices however show a tendency to expel air. Thus it is possible to fabricate an oil filled devices with residual bubbles from the filling process. Over a period of a few days, for example in storage or transport, these bubbles will leave the lenses. Thus, the yield of the filling process is substantially increased and the element cost reduced. Alternatively, the device can be off-gassed by placing in a vacuum chamber for a short period.

The optical power of a lens in contact with silicone oil is typically less than half of the optical power for the same lens in air. This can be corrected by using surfaces with reduced radius of curvature or by increasing the thickness of the substrates 100, 122 to compensate.

When a liquid, the intermediate material 120 may contain surfactants, fungicide and other additives to preserve the life of the device as is known. The substrates 100 and 122 may comprise further barrier layers and/or oxygen scavenging layers to prevent ingress of oxygen within the cell. As shown in FIG. 2b, which is a plan view of the apparatus of FIG. 5 and FIG. 2a, the intermediate material 120 may be sealed in a cavity be means of a peripheral seal 129 which may comprise an adhesive material. A gap 125 can be formed in the peripheral seal 129 through which the liquid is used to fill the gap between the substrates 100 and 122 after evacuation of that gap. A hole seal 127 is used to seal the gap 125 after filling. Alternatively, the intermediate material 120 may be sealed by means of a honeycomb structure, or other matrix of polymer material, such that the intermediate material 120 is held within pockets.

Such use of an intermediate material 120 having a refractive index greater than air has a number of advantages. The refractive index steps at the interfaces of respective substrates 100 and 122 with the intermediate material 120 is substantially smaller than the than the interface refractive index step to air. In the above example of the intermediate material 120 being water, the normal (perpendicular) reflectivity of air to polymer of 5% may be reduced to the normal Fresnel reflectivity of water to polymer of 0.7%. Thus, the visibility of the lens surface can be substantially reduced. The impact of Fresnel reflection is further reduced by total internal reflection at the planar front surface 123 of the front substrate 122 of light reflected from surfaces 102 and 142, as shown by rays 148, 150 and 152. Thus, the apparatus has two cooperating mechanisms which reduce the impact of reflectivity of the surfaces 102 and 142.

Advantageously, the low reflectivity of the surfaces 102 and 142 also reduces the cross-talk of the respective lens surfaces by reducing the reflection of light at the lens interface for light reflected from the image plane towards the observer.

Advantageously, the cost of the liquid intermediate material 120 and front substrate 122 can be substantially smaller than known alternative reflection reduction technologies.

An intermediate material 120 having a refractive index greater than air reduces the optical power of the lens surfaces of the surfaces 102 and 142 of the substrates 100 and 122. The reduction in optical power can be compensated by reducing the radius of curvature of the lens surfaces of the surfaces 102 and 142, or increasing the separation of the lens surfaces of the surfaces 102 and 142 from the printed image surface 106. An additional substrate can be incorporated to increase the thickness of the device, advantageously with properties designed to minimise water egress or oxygen ingress into the liquid within the cell.

The front surface 123 of the front substrate 122 can have anti-reflective layers to minimise the specular reflection of external light sources, and or can have hard coat materials and barrier layers.

Spacer elements 144 are positioned in the intermediate material 120 between the substrates 100 and 122. The spacer elements 144 contact the surfaces 102 and 142, in particular being over the cusps 138 between lens surfaces of the surfaces 102 and 142. The cusps 138 are formed at the interface between adjacent lens surfaces of the surfaces 102 and 142, nominally at half of the separation between the optical centres of the lens surfaces. The cusps 138 may have a sharp profile, or may have a flat portion, depending on the method used to fabricate the lens surfaces. Thus the spacer elements 144 contact both of the adjacent lens surfaces of the surfaces 102 and 142.

As a result of this contact the spacer elements 144 not only space apart the substrates 100 and 122 but also provide lateral optical axis alignment of lens surfaces of the surfaces 102 and 142 so that they are coaxial. The spacer elements 144 may be mechanically aligned with the cusps 138 during assembly by sliding the front substrate 122 over the rear substrate 102. Thus the spacer elements 144 also act as an alignment elements. The spacer elements 144 may be aligned by means of fluidic self-assembly.

The spacer elements 144 may be fibres which may be cylindrical or balls which may be circular, in either case with a circular cross-section.

The physical size of the spacer element 144 is set to have a minimum size to fill the cusps 138 of the lens surfaces. The diameter of the spacer elements 144 may be set to be larger than that required to space the surfaces by contact on both surfaces. Advantageously this can improve the accuracy of alignment on surfaces in which there may be some bend between the two substrates 100, 122 so that the spacer element 144 is not in contact across the entire area of the substrates 100, 122. The spacer element 144 may be a fibre (such as a wire) or a ball with a cross sectional diameter such that spacer element 144 is in contact with two lenses on each substrate 100 and 122. In the case of the spacer elements 144 being balls, they may be applied for example by spraying them using compressed gas through a nozzle.

In normal use, the seal of the intermediate material 120 with the substrates 100 and 122 may undergo substantial forces if the device is bent and apply a force tending to vary the gap between the substrates 100 and 122 across the area of display apparatus. This may prevent the intermediate material 120 filling the gap between the substrates 100 and 122 correctly, leaving air bubbles as well as modifying the optical power of the lens surfaces. It is desirable that the substrates 100 and 122 are maintained at a substantially constant mechanical separation to prevent damage, particularly when the intermediate material 120 is a liquid which can leak its seal breaks. However, the spacer element 144 can adhere to the substrates 100 and 122 hence reducing this problem.

One possibility is that the spacer element 144 may be coated by an adhesive material 146 which adheres to the rear substrate 100 and front substrate 122. This may be achieved by the spacer elements 144 being contained within an adhesive and solvent prior to application. Alternatively, the spacer elements 144 may be designed to embed within the adhesive layer of a pressure sensitive adhesive or edge seal region 129. The spacer elements 144 may further be formed from an adhesive material.

Another possibility is that Van der Waals forces can serve to provide certain adhesion between the spacer element 144 and the substrates 100 and 122.

The lens elements of FIG. 5 may be comprise further security features. On-axis the lens may operate as a lens in which the features to the rear of the device are imaged. Off axis, the ambient light reflection may cause the lens surface 142 to act as a mirror, so that the printed feature is not visible. Such an element has advantageous use as a security feature, in addition to having reduced thickness compared to the ambient environment. Printed features positioned on the surface 123 can cooperate with the ambient reflected light such that they have a strong visibility from certain directions of illumination while the features 104 have a visibility from different illumination directions.

The radius of curvature of the surface 142 may be optimised to tune the total internal reflection of the ambient light, while the surface 102 may be optimised to produce the required focus conditions at the printed surface 106.

Figure 2A:
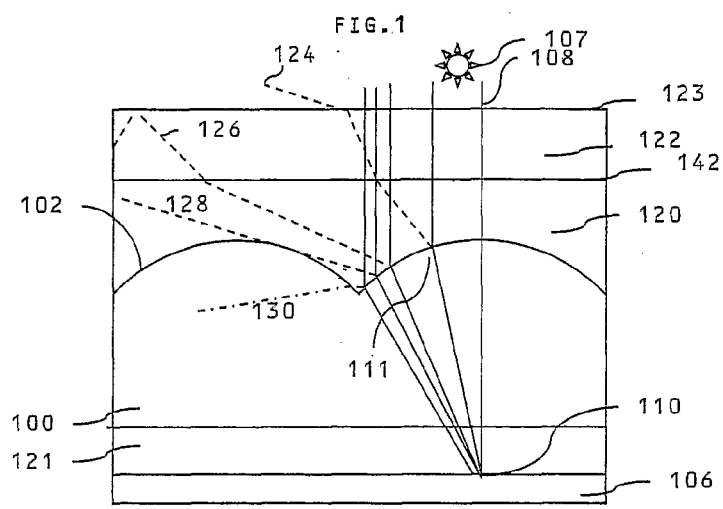
FIG. 2a shows a low reflectivity lens array in cross section.
Figure 2B:
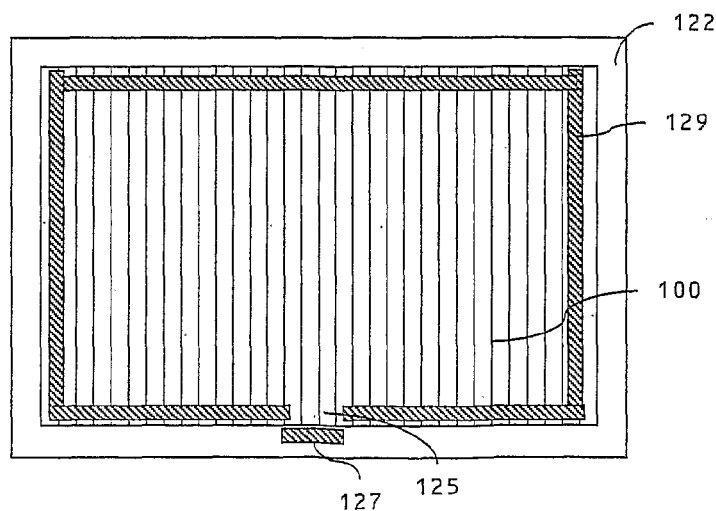
FIG. 2b shows a sealing arrangement of the lens array of FIG. 2a and FIG. 5 in plan view.

A directional printed image display apparatus in accordance with the third aspect of the invention is shown in FIG. 2a. It has the same construction as the display apparatus of FIG. 5 except that the intermediate material 120 is a liquid and the front substrate 122 has a planar rear surface 142. Thus front substrate 122 merely contains the intermediate material 120 such that only the lens surfaces of the rear substrate 100 directs light from the image surface 106 into nominal viewing windows. As an alternative, the lens surfaces could be provided on only the rear surface 142 of the front substrate 122 with the front surface 102 of the rear substrate 100 being planar.

The use of a liquid as the intermediate material 120 has the same effect as described above.

The refractive index steps at the interfaces of the rear substrate 100 with the intermediate material 120 is substantially smaller than the interface step to air. In the above example of the intermediate material 120 being water, the normal (perpendicular) reflectivity of air to polymer of 5% may be reduced to the normal Fresnel reflectivity of water to polymer of 0.7%. Thus, the visibility of the lens surface can be substantially reduced.

Further, for normal viewing of the lens array by rays 108, a ray is reflected from position 111 along ray 124 in air. This ray is at a higher angle to the normal than for the equivalent ray for the lens directly in air, and is thus less likely to come from a light source which can create a reflection. For positions further from the lens axis, rays 126 and 128 are generated. These rays undergo total internal reflection at the outer surface of the substrate 122, and thus are unable to show reflections from an external light source. Thus, no light can be directed to an observer from the respective incident positions on the lens surface 102. The surface reflections are reduced by means of total internal reflection If the refractive index of the material 120 is reduced, then the Fresnel reflectivity at the surface 102 is increased, and further the critical angle of the medium to air increases, such that the amount of light that can be directed from external light sources by reflection from a lens surface increases. Thus, reducing the refractive index of material 120 disadvantageously increases the visibility of the light source. Desirably, the refractive index of the material 120 is closer to the refractive index of the substrate 100 than 1.0, so as to optimise surface appearance. The present invention cooperates in two ways to reduce the reflectivity of the surface of the lens substrate.

The use of a liquid as the intermediate material 120 reduces the optical power of the lens compared to its power in air. To provide focussing substantially on the image surface 106 surface of the lens, a spacer substrate 121 may be disposed between the rear substrate 100 and the image surface 106, thereby advantageously allowing the substrate 100 to be one designed for use in air. The spacer substrate 121 may have properties designed to minimise water egress or oxygen ingress into the liquid within the cell. The spacer substrate 121 may alternatively be formed by adding thickness to the substrate 100. Alternatively, the reduction in optical power can be compensated by reducing the radius of curvature of the lenses on surface 102, or increasing the separation of the lens surface from the image surface.

Figure 3:
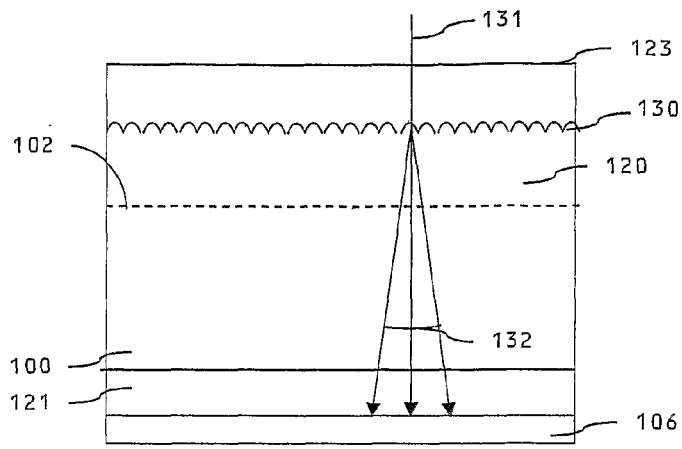
FIG. 3 shows a vertical diffuser for a low reflectivity lens array.

The inner surface of the substrate 122 may further comprise a diffuser element 130 as shown (in orthogonal cross section) in FIG. 3. The diffusion may preferentially provide vertical diffusion, i.e. diffusion orthogonal to the diffusion provided by the lens substrate 100, in which the lens surfaces of the surface 102 provide horizontal diffusion. Vertical diffusion properties may operate to further reduce the visibility of smearing of light from the light sources across the lens array. The Fresnel reflections of light from the diffuser element 130 are minimised because it is in contact with the intermediate material 120. The diffuser element 130 may further reduce the visibility of any dot screen structure in the printed image. The diffusion angle 132 from an incident light ray 131 may be set to be equivalent to the dot size on the printed image plane 106. The diffuser element 130 may comprise a surface relief structure, such as a lens array, a prism array, a diffractive structure or other elongate diffusion structure. Preferably, lateral diffusion properties (i.e. spreading of light orthogonal to the lens axis) of the elements are minimised.

Optionally, a vertical diffuser could be applied to the front surface 102 of the rear substrate 100. However, such a structure is difficult to fabricate due to the lens surfaces formed on this front surface 102, and may degrade lens performance. Further, it would be undesirable to use common lens elements for both air and the case with refractive index of the intermediate material 120 is greater than one due to the high levels of scatter which may be observed in air.

Figure 4:
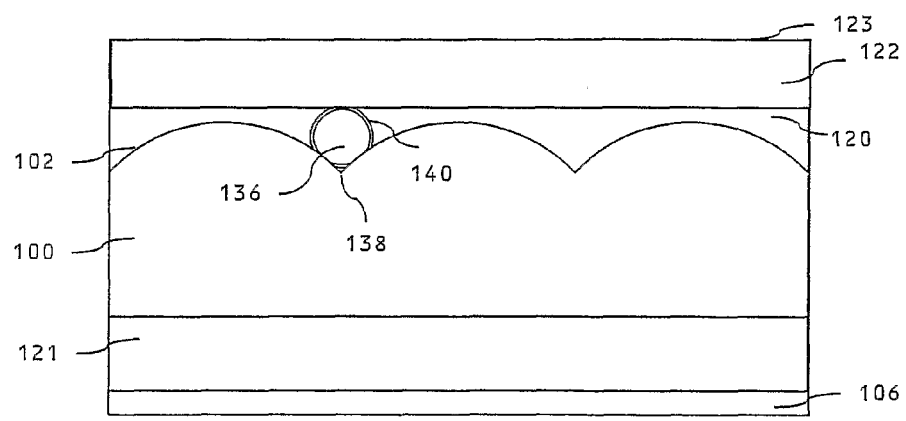
FIG. 4 shows a spacing mechanism for a low reflectivity lens array.

Spacer elements 136 may be positioned over the cusps 138 of the lens surface 102 as shown in FIG. 4. The spacer elements 136 are the same as the spacer elements 144 described above 136 except that the spacer elements 136 may have a smaller diameter than the spacer elements 144. Thus a description of the spacer elements 136 is not repeated.

Figure 7:
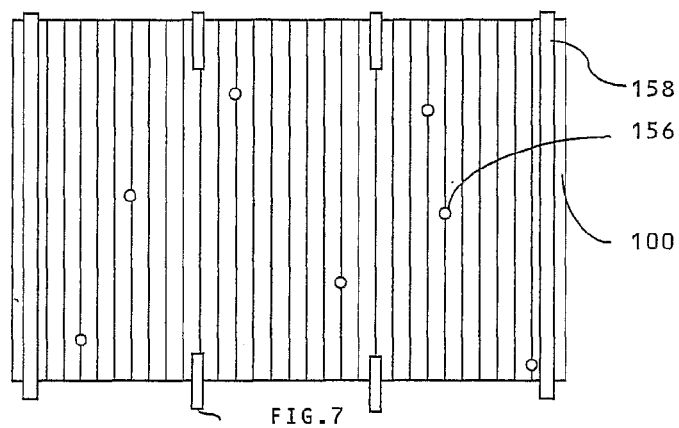
FIG. 7 shows the arrangement of spacer elements in a double lens array.
Figure 8A:
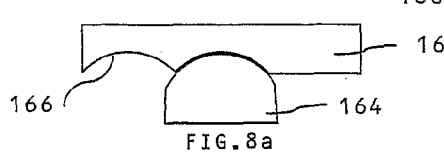
FIG. 8 shows a method to fabricate an integrated spacing element.
Figure 8D:
Figure 8B:
Figure 8E:
Figure 8C:
Figure 8F:

The spacer elements 136 or the spacer elements 144 may be spacer balls 156 dispersed over the entire image area, as shown in FIG. 7. This can for example be achieved by means of spraying using compressed gas. Alternatively, the spacer elements may be fibres 158 positioned preferably outside of the image area of the display apparatus, or fibres 160 positioned at the edge of the display apparatus. The spacer balls 156 and the lens surfaces of the surfaces 102 and 142 may be shaped to enable fluidic self assembly where the spacers self locate in lens features or are otherwise washed off.

Any combination of the above may provide required alignment performance. Advantageously, the spacer elements 136 or 144 in the image area may incorporate an adhesive function. Following application of the spacer elements, the lenses may be aligned.

To further reduce cost, elements 134 or 136 may instead be formed as a surface relief feature 180 formed on one of the substrates 100 or 122 at time of mastering, so that they are replicated onto the surface 102 or 142, as shown in FIG. 8. A tooling block 162 has a diamond tool 164 cut a surface relief 166 into it. The resultant structure 168 has an inverse tool 170 formed from it, for example by electroforming. A spacer element 174 is attached to the surface of tool 170 as described above, and a second electroforming step is used to form a replication tool 176. The replicated element 178 is thus formed with integrated spacer element 180. Some rounding of the features is likely which serves to provide alignment but the top surface of the feature is preserved.

The intermediate material 120 may have a higher refractive index than the lens substrates 100 and 122, as shown in FIG. 9, in which case the rear surface 142 of the front substrate 122 and the front surface 102 of the rear substrate 100 are shaped as respective arrays of concave lens surfaces. The spacer element 184 may then be aligned in the centre of the lens apertures 190, 192, rather than the cusps. The intermediate material 120 may be for example oil with a high refractive index. Fresnel reflections from portions of the surfaces 142, 102 are again totally internally reflected by the outer surface 123 as shown by the ray 182 for incident rays 186.

FIG. 10 shows a display apparatus in accordance with the third aspect of the present invention and having lens surfaces formed on the rear surface 142 of the front substrate 122 and a planar front surface 102 of the rear substrate 100, so as to optimise aberrations. Spacer pillars 194 formed as part of the front substrate 122 are positioned in cusp regions of the lens surfaces, so as to provide adhesive contact between the substrates 100 and 122.

In many printed applications, it is desirable that both two dimensional and three dimensional image data are presented. In wide viewing freedom images, the resolution of the 3D image is substantially lower than that for the 2D image, for example one eighth. This leads to resolution loss in a first dimension, and subsequent difficulty in perceiving high resolution features. Further, the non-specular reflectivity of the lens produces the artefacts in the image described above. Further, the lenses have a diffusing function, so that objects behind the lenses are blurred, and cannot be resolved. It is therefore desirable to remove the lens effect in regions of the image in which 2D image data or a transparent window is to be displayed.

It is a particular advantage of all the display apparatuses in accordance with the present invention described above that this may be achieved simply by printing a single image on the front surface 123 of the front substrate 122 in the region or regions where it is desired to display a two dimensional image. The image on the front surface 123 masks the light coming from the image surface 160 and directed by the lens surfaces of the substrates 100 and 122. The printing is easily accomplished due to this front surface 123 being planar, whereas printing is generally not possible with a conventional display apparatus of the type shown in FIG. 1 due to the surface relief of the front surface 102. It is also difficult to attach a further printed substrate to such a conventional display apparatus by means of adhesive due to the poor surface adhesion of the surface relief.

Figure 21:
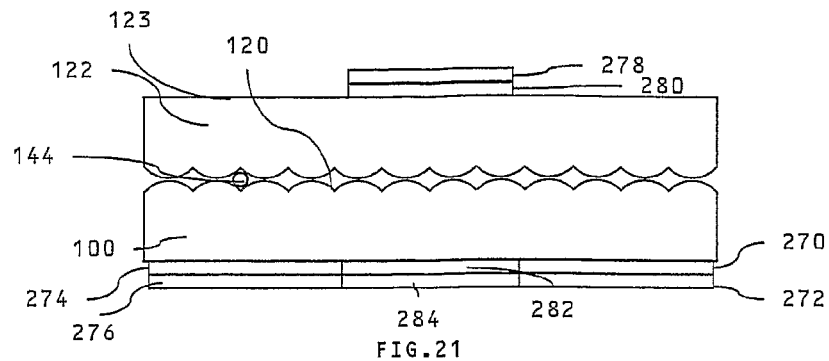
FIG. 21 shows an apparatus with images positioned on front and rear lens surfaces.

FIG. 21 shows an example of a display apparatus having an image on the front surface 123. The display apparatus has the same form as that shown in FIG. 5 but with the following images printed on the substrates 100 and 122.

On the rear surface of the rear substrate 100 is printed image layers 270, 274 including a plurality of interlaced printed images in the same manner as the image surface 106 described above. To provide reflective operation, backing layers 272, 276 are positioned behind the image layers 270, 274. The backing layers 272, 276 may be formed from paper or a white ink for example. To provide transmissive operation in which a separate backlight unit is used, backing layers 272, 276 are omitted.

In region 278, two dimensional printed image is formed on the front surface of the front substrate 122. A backing layer 280 may be formed between the substrate 122 and image layer 278, which may be paper or a white ink for example. It is thus possible to form a printed directional image which has a region 280 displaying a two dimensional image which can be of high resolution relative to the plurality of interlaced printed images of the printed image layers 270, 274. The area and position of the two dimensional image is advantageously formed by defining the pattern of regions 278, 280 and does not require modification of the surface relief structures.

Such an apparatus does not require treatment of the surface relief lens surfaces in order to remove their optical power, and requires fewer changes to the printing equipment required to achieve the mixed 2D and 3D images, thus reducing cost. The substrates 100,122 may be separately printed prior to assembly of the combined lens device. Thus, the printing process can be common for both substrates, reducing cost of the device.

In a further embodiment of the invention, a backing layer 284 can be formed on the rear surface of substrate 100, so as to provide an additional scattering function for the front printed image 278. Such a layer may allow the omission of region 280, thus reducing printing cost. Further, if a layer 282 with directional image data is incorporated, the high resolution two dimensional image in region 278 may be seen superimposed on the directional information. The regions 278,280 may for example be patterned text on a transparent background. Alternatively the layers 282,284 may be omitted to save the cost of ink.

As shown in cross section in FIG. 11a, the lens surfaces of the surface 102 of the substrate 100 can be planarised by deposition of an overcoating material 200 for example an ink, a varnish or a curable polymer, such as a radiation cured polymer or a thermally cured polymer. Preferably, the overcoating material 200 is optically transparent and has substantially the same refractive index as the material of the substrate 100, so the lens surface 102 has no effect in the region of the overcoating material 200.

Such an arrangement may be applied in any of the display apparatuses described above and has a number of disadvantages. First, the adhesion between the material 200 and the substrate 100 must be sufficient to prevent the overcoating material 200 from peeling off in use. Further, during coating, the overcoating material 200 may run along the length of the lenses, as shown in plan view in FIG. 11b. In the desired overcoating region 202, the material is preferably required to have sufficiently low viscosity such that it flows into the lens form, to provide a flat output surface. However, typically capillary forces create lateral fill forces on low viscosity materials such that they tend to flow along the lens axis to form lens degrading regions 204. It is therefore difficult to provide overcoating material 200 with high flatness, so that the external surfaces provide adequately uniform specular reflection, while remaining within the desired region of the display apparatus. A thixotropic material which has reduced viscosity under stress during processing but higher viscosity on removal of stress after processing may be used.

FIG. 11c shows a further display apparatus employing a single substrate 100 as shown in FIG. 1. This display apparatus is in accordance with a yet further aspect of the present invention. The overcoating material 200 is further coated with a white ink 280 and a high resolution, two dimensional printed image 278. In this case, advantageously, the refractive index 200 of the coating material does not need to be matched to the refractive index of the lens. However, such an arrangement does not allow high resolution text to be superimposed over a directional image, and requires printing of both front image 278,280 and rear image 106, increasing cost.

Figure 12A:
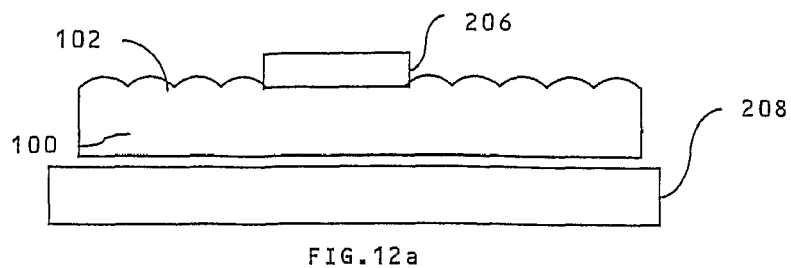
FIG. 12a shows a first method to provide flat areas on a lens substrate.
Figure 12B:
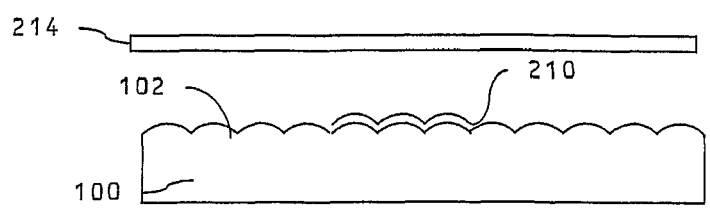
FIG. 12b shows a second method to provide flat areas of a lens substrate.
Figure 12C:
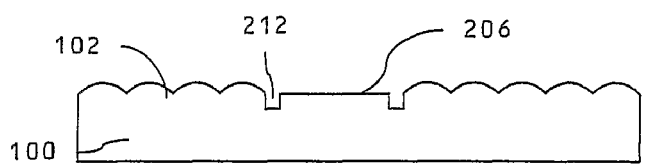
FIG. 12c shows a lens with flat areas.

An alternative approach is illustrated in FIG. 12. FIG. 12a shows a process to provide flat regions within the surface 102 for 2D operation. A substrate 100 has a surface 102 shaped as an array of lenses in which in a limited region is deformed by a heated block 206. Further pressure may be applied to deform the surface structure. Deformation may be achieved at high pressure and temperature of typically 70° C. or above for PETG lenses. To ensure deformation of the surface 102 alone, a heat sink surface 208 may be positioned behind the lens so as to limit heating of the remainder of the substrate 100, and thus minimise deformation of non-heated lens surfaces. Further, the heated block 206 may have a structure 207 formed in it, so that further structure 212 is produced in the final display apparatus, as shown in FIG. 12c.

Alternatively, as shown in FIG. 12b the substrate 100 is printed by means of known printing methods such as flexography, screen printing, lithography or inkjet with an infra-red absorbing material 210, such as a dye. An infra-red light source 214 which may be an area source, or a scanning line infra-red source illuminates the lens, and melts the lenses that have the infra-red absorber deposited upon them. Alternatively if sufficient infra-red absorbing material 210 is printed, the infra-red absorbing material 210 itself melts and so fills the cusps. Alternatively, a scanning infra-red source such as a laser source could be used to scan the lens area. Yet further the lens material itself may incorporate an infra red absorber and the scanned laser source modulated image wise to produce the required 2D regions without an absorber printing step.

Figure 14:
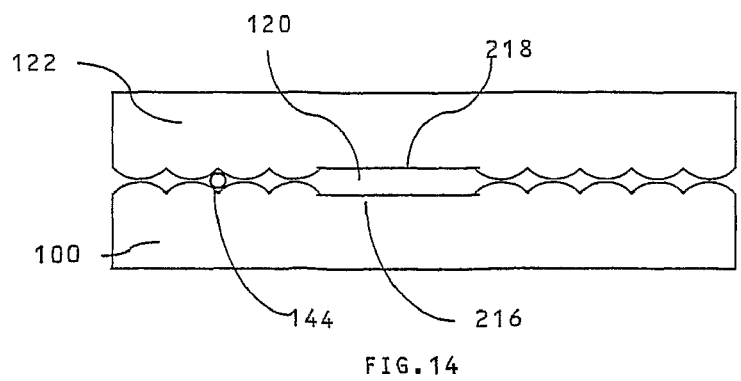
FIG. 14 shows a dual lens device with lensing and non-lensing regions.

FIG. 14 shows an assembled display apparatus in which planar regions 216, 218 are formed within the image area. Advantageously, the display apparatus is filled with an intermediate material 120 such that the surfaces 216, 218 have substantially reduced Fresnel reflectivity compared to the same surfaces in air. This display apparatus thus substantially reduces the surface quality that is required during fabrication of the planar surfaces 216, 218.

FIG. 15 shows in cross section view a further printed image display apparatus in which the lens element is provided with seal regions 220, 224. Seal region 220 is shown with planar seal area 222, whereas seal region 224 is provided with 'keyed' surfaces in order to improve adhesion between the surfaces of the seal. If the surfaces of the substrates 100 and 122 in the region are sealed, the sealant ideally has the same refractive index as the substrates 100 and 122. Further substantially planar regions 228 are provided within the surfaces of the substrates 100,122 so as to provide a transparent mode of operation. In the region 232, the printed layer 230 is removed, or is left unprinted. Such a transparent area allows users to see through the printed lenticular image to packaged contents beyond its surface. Advantageously, this can enhance the presentation of package articles.

Figure 13:
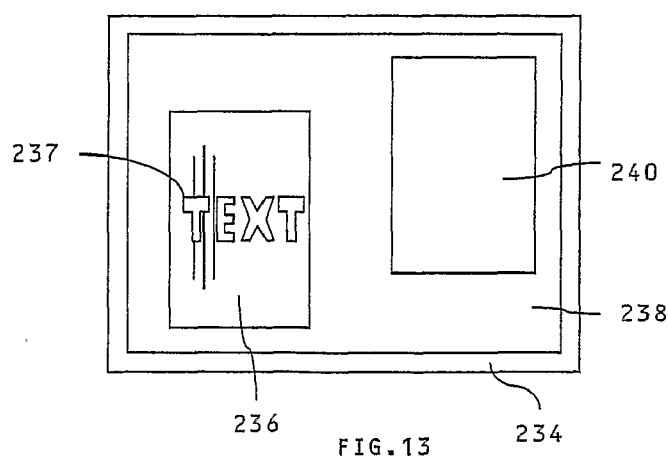
FIG. 13 shows in plan view a lens with 2D, 3D and transparent regions.

FIG. 13 shows the printed lens elements of FIG. 21 and FIG. 15 in plan view, comprising seal regions 234, lens array regions 236, full resolution 2D regions 238 and transparent regions 240. Further 2D regions 237 for example text or logos can be overlayed on both lens and transparent regions, providing high image quality for the overlayed images. Further, such overlayed printed data 237,238 does not have the same variation of brightness with viewing angle that is shown for the directional images from the lenticular regions 236. The layout of each of the regions is defined by the structure imparted by glueing and lens modification stages.

In all the display apparatuses shown in FIGS. 11 to 15 and 21, in the regions where the effect of the lens surfaces is removed, the printed images on the image surface 106 are replaced by a single image across the entirety of those regions or is omitted.

FIG. 16 shows a method for fabrication of a printed image display apparatus. The rear substrate 100 has a printed image surface 106 with non-image regions 232 formed on its rear surface, as shown in FIG. 16a. FIG. 16b shows that non-lensing regions 222, 228 and pits 242 are formed on its top surface. Pits 242 may be formed by using the techniques above, or may use a hot wire for example led around the edge of the seal area. In FIG. 16c, adhesive 244 is applied to the surface of the substrate 100 by means of screen printing for example.

In FIG. 16d, the substrate 122 is positioned over the top of the substrate 100, using alignment spacers 144. A fillet of material 120 is introduced into the cell gap between the two substrates 100 and 122 and a roller 246 used to compress the two substrates 100 and 122 together. Pits 242 can be used to capture excess adhesive 244 at the edge of the seal so that it does not flow onto the surfaces 102 and 142. The material 120 is preferably immiscible with the adhesive 244.

After the two substrates 100 and 122 have been assembled, the adhesive is cured by means of thermal cure or UV cure for example. To dice the completed substrate along cut lines 248, cutting tool 250 may be used. Thus, diced substrates can be produced to meet the requirements of the printed output dimensions.

Figure 18:
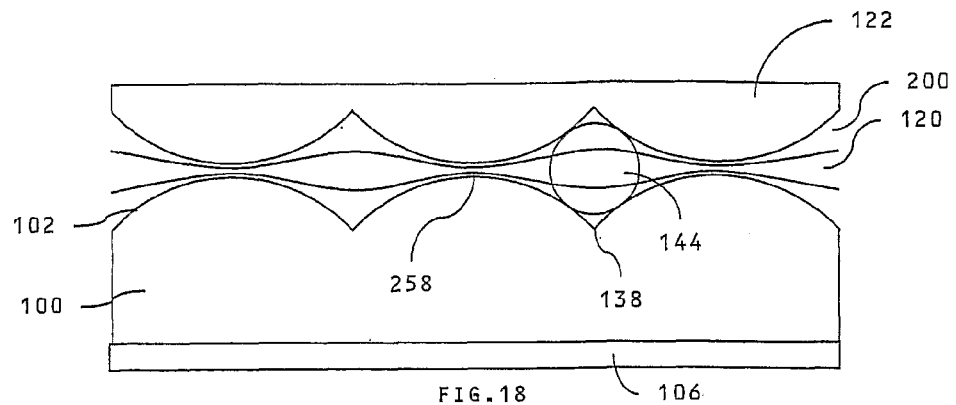
FIG. 18 shows an overcoating structure for a lens array.

A display apparatus comprising an overcoating material 200 is shown in FIG. 18. The overcoating material 200 is applied to the substrate 100 surface 102 by means of for example printing. The spacer elements 144 may be embedded in the overcoating material 200. The overcoating material 200 at least partially planarises the lens surfaces, and has a refractive index substantially matched to that of the substrate 100. However, it may be difficult to completely planarise the lens surfaces, so that the surface height in the region 138 is different to the height in the region 258. Such a surface in air can provide substantial lens visibility in specular illumination. However, the lens visibility is substantially reduced by the intermediate material 120, and thus a clear 2D image can be produced. The spacer element 144 diameter can be increased to compensate for residual thickness in the lens peak region 258.

Figure 19A:
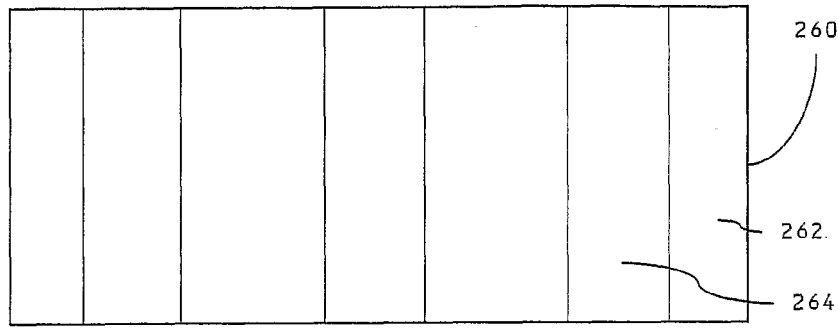
FIG. 19 shows a method for printing an overcoating structure.
Figure 19B:
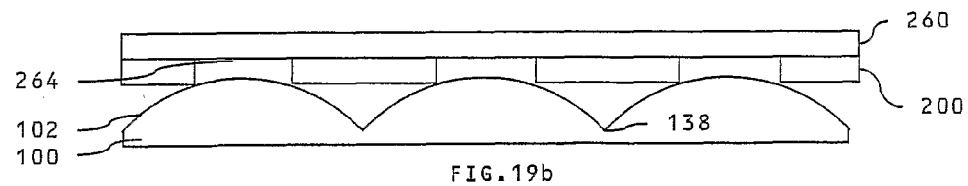
Figure 19C:
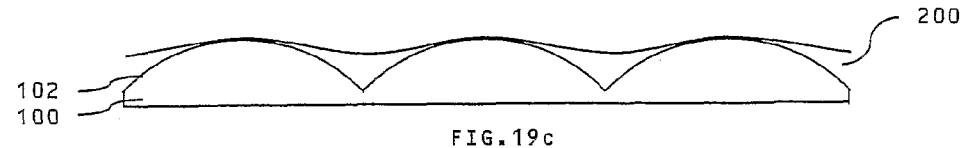
Figure 20:
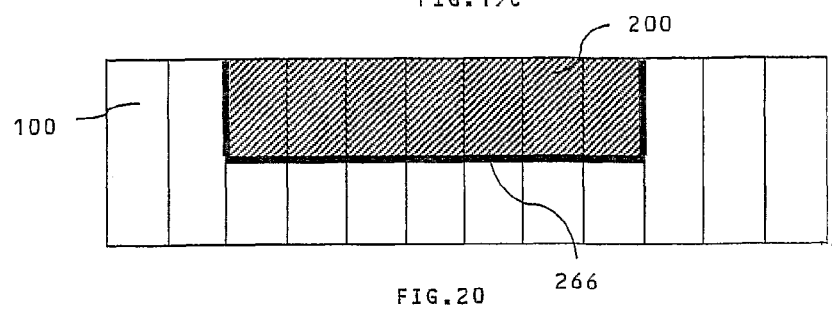
FIG. 20 shows an apparatus comprising glue confinement features.

FIG. 19 shows one printing method for applying the planarising adhesive. As shown in FIG. 19a, a printing plate 260 has a layer of adhesive 200 with pillar regions 262 and gap regions 264 formed upon it. The printing plate may be part of the printing process. The adhesive 262 may be UV curable adhesive. As shown in FIG. 19b, the pitch of the regions 262 may be set to be the same as the pitch of the lens cusps 138, and the regions 262 may be centred on the cusps 138. The degree of planarisation of the material 200 when cured on the lens may be controlled by setting the thickness of the material 200. Conveniently, fine tuning of the planarisation may be achieved by controlling the width of the features 264. Thus, the same or similar apparatus to that currently used by printer may be used to form the 2D planarisation regions. To prevent the uncured material 262 wicking along the lenses on the lens substrate, a cut mark 266 may be formed in the lens surface prior to printing of the planarising material as shown in FIG. 20.

Advantageously, this method allows the printer to arbitrarily define the regions over which the over which the planarisation regions will be formed will be formed using existing printing equipment. The accuracy of planarisation can be carefully controlled. In general, some surface modulation of the planarisation layer 200 is produced. Advantageously, the intermediate material 120 of the present invention substantially removes visibility of reflections from the planarising surface.

Such a technique may also be appropriate for lenses for use in a gas or partial vacuum, in which case the front substrate 122 and interface layer 120 are not present.

The material 200 could also be applied by means of inkjet dispensing, using for example UV curable inks. The ink distribution pattern could be similar to that shown in FIG. 19, so as to calibrate the system for optimum planarisation control.

FIG. 17 shows a further display apparatus similar to that shown in FIG. 5 but in which the front substrate 122 has a lower thickness than the rear substrate 100 although it is otherwise the same as the front substrate 122 of the display apparatus of FIG. 5a. The front surface 102 of the rear substrate 100 and the rear surface 142 of the front substrate 254 may be substantially identical, or may have optical properties, including radius of curvature, refractive index or conic constant for example designed to optimise aberration performance of the combined lens array.

Such a display apparatus has a number of advantages when applied to thin lens approaches in which the lens pitch and sag are both required to be reduced. The optical power is increased as described above. This allows a higher numerical aperture lens, and thus a thinner device than for the corresponding lens pitch and sag in a comparable display apparatus of the type shown in FIG. 1. The overall thickness of the display apparatus may thus be substantially reduced. For example, a 140 lpi PETG lens may have a thickness which is reduced from 320 microns to 210 microns. Such a display apparatus is particularly advantageous for thin articles such as labels and for packaging. Further, the resistance against tearing is reduced by means of the laminate structure of the display apparatus and the adhesion supplied by the spacer element 144. Such a device is thus thinner and more rugged than a comparable display apparatus of the type shown in FIG. 1. Further the printing tolerances are more relaxed in the lens of FIG. 17 than for the equivalent reduced pitch lens. Such a device is more easily and cheaply printed with higher yield.

In this case, the printed image surface 106 may be replaced by the pixel plane of a spatial light modulator, including transmissive displays, emissive displays and transflective displays. In this case, the strips of dots are replaced by strips of electronically addressed pixels. Such a device advantageously will provide a low reflectivity lens surface for a display device operating in the directional mode only. The lens array may be positioned within an external polariser, or external to an external polariser. Such a device may be cheaper to fabricate than liquid crystal filled lens components.

The low reflectivity lens elements of the present invention, such as those employed in FIG. 2a and FIG. 5, may also be applied to an electronic display apparatus. In this case, the printed image surface 106 may be replaced by a spatial light modulator (SLM) having an array of pixels. In this case, the strips of dots are replaced by strips of electronically addressed pixels. The plurality of interlaced images are displayed by operation of the spatial light modulator. Groups of pixels are aligned with each lens surface of the rear substrate 100 and front substrate 122. A successive strip of each image is displayed by each group of pixels. In general the SLM may be of any type including transmissive, emissive and transflective.

Figure 24:
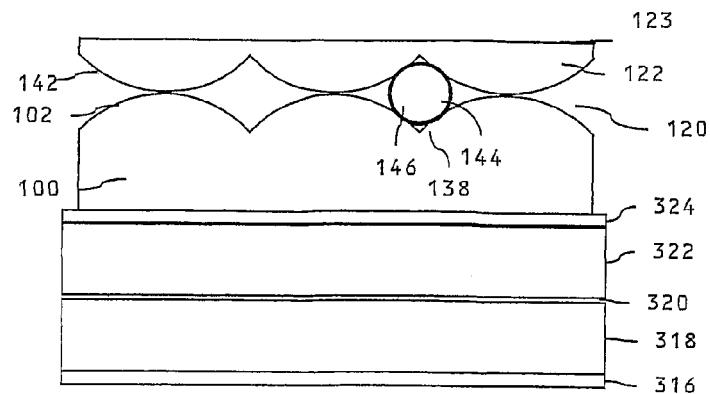
FIG. 24 shows a directional display apparatus.

By way of example, a 3D mode liquid crystal display apparatus is shown in FIG. 24 and comprises a spatial light modulator consisting of: a rear polariser 316; a TFT substrate 318; a pixel plane 320 of liquid crystal material; a counter substrate 322; and an output polariser 324. In front of the spatial light modulator this is disposed a lens element including a rear substrate 100, intermediate material 120 and a front substrate 122 and being identical to the lens element employed in the printed image display apparatuses described above.

Such a display apparatus advantageously will provide a low reflectivity lens element operating in the directional mode only. The lens element may be positioned within an external polariser, or external to an external polariser. Such a device may be cheaper to fabricate than liquid crystal filled lens components. Further, an anti-reflection coating can be conveniently applied to the front surface of the display apparatus, to further improve image quality in brightly lit environments.

The lens elements described above employ two substrates 100, 122 each having a surface provided with a surface relief shaped as an array of lens surfaces. However the invention is generally applicable to a lens element in which the surface reliefs are shaped to provide a lens effect in any manner. One alternative is that the surface relief is shaped as a Fresnel lens and there will now be described apparatuses in which such a lens element is employed.

A backlight apparatus for a display typically uses a number of components including waveguides, reflectors, diffusers and brightness enhancement films. These components typically rely on interfaces between plastic and air, and thus incur Fresnel reflection losses at each interface and scatter losses from irregularities in features. Further, such films cannot be conveniently bonded together. It would be desirable to reduce the amount of scatter losses and Fresnel reflection losses to increase backlight efficiency.

Figure 22:
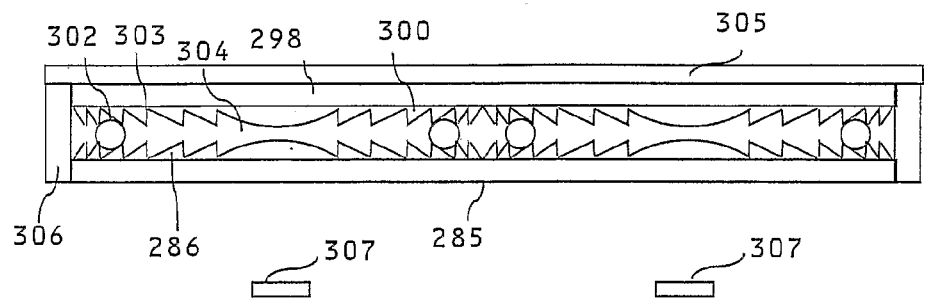
FIG. 22 shows a backlight optical apparatus.

Thus the lens element of the present invention may also be applied to a backlight apparatus. An example of such a backlight apparatus is shown in FIG. 22. The backlight apparatus comprises LED light sources 307. In front of the light sources 307 there is disposed a lens element used as part of a light guiding plate. The lens element is formed from: a first substrate 285 having a surface relief structure 286, the front surface of which has a surface relief shaped as a Fresnel lens; and a second substrate 298 having a surface relief structure 300, the front surface of which has a surface relief shaped as a Fresnel lens. The Fresnel lens surface relief of each substrate 285, 298 have zones of the same spatial arrangement over the area of the lens element. As a result the two substrates cooperate optically and both provide optical power. The curvature of the surface reliefs of the two substrates 285, 298 may however be different.

The Fresnel lens surface reliefs of the two substrates 285, 298 are aligned coaxially by means of an alignment element 302 such as a spacer ball or fibre of the same type described above; so that the substrates 285, 298 have low levels of Moiré beating between them. The lens element is filled with an intermediate material 304 being a solid or liquid isotropic material such as a silicone oil and may be sealed by means of sealing elements 306. The substrates 285, 298 may be permeable to gas so that the element degasses following a filling stage. Such a lens element advantageously reduces the surface reflections at the structures 286, 300, while maintaining the optical power of the device.

Such a lens element advantageously substantially reduces light loss at the cusps 303 of the lens elements that would occur if the elements were placed in air. Therefore, undesirable light losses can be minimised, and a backlight can be made more efficient. Further, manufacturing irregularities of the surface of the lens elements are less visible, so that lower cost lens mastering and replication techniques may be used.

Further elements such as diffusers or other light management films 305 can be adhered to the front and back surface of such an element, as the surfaces are flat. Advantageously, this reduces the number of interfaces to air in the backlight stack, and losses at the air-plastic interfaces of the layers in the backlight films. Further, the structures 286, 300 can have alternative light management properties such as diffusion, or total internal reflection.

Figure 23:
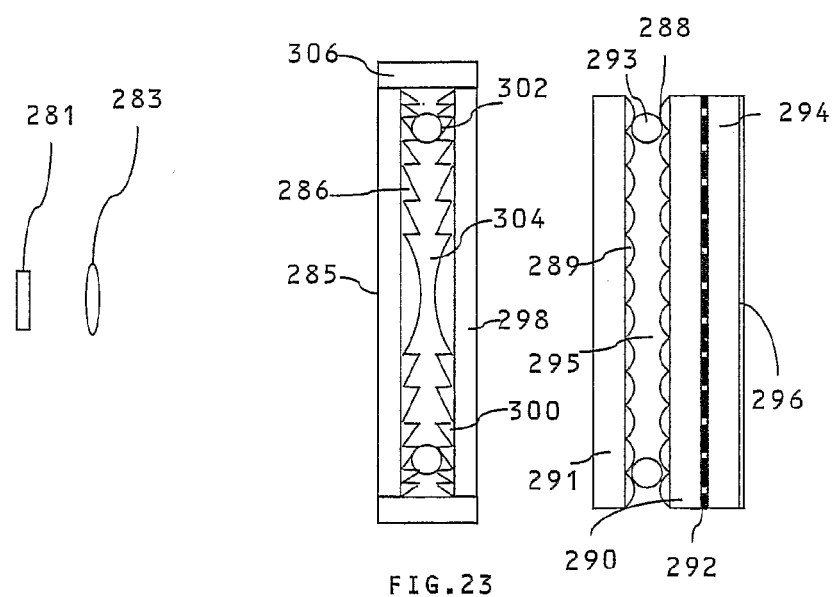
FIG. 23 shows a projection optical apparatus.

The lens element of the present invention may also be applied to a projection display apparatus. An example of such a projection display apparatus is shown in FIG. 23. Light from an image display apparatus 281 is directed through a projection lens 283 onto a projection screen comprising lens elements in accordance with the present invention as will now be described.

A first lens element is formed with Fresnel lenses and has the same construction as the lens element in the backlight apparatus of FIG. 22. This first lens element has the function of a field lens for the light from the projection lens 283, as well known in the art, and is arranged to convert the image of the projection lens 283 into substantially parallel rays towards an observer. Conventional Fresnel lenses suffer from losses due to scatter at the surface of the lens in air, which arise from Fresnel reflections at the interface of the material and air. Such losses are higher nearer to cusps in the lens surface, providing an intensity variation across the lens surface and can further beat with the pixel structure of the projected image, causing Moiré beating between the structure of the lens and pixels. Advantageously, the Fresnel lens element has substantially the same optical power as the original lens, while the level of scatter at the lens surface is substantially reduced, and the Moiré pattern beating is thus reduced. Such a lens can use low cost low index materials. Further, the quality of the surface of the Fresnel lens need not be as high as for lenses used in air, and thus lower cost tooling an replication techniques may be used for fabrication of the surfaces of the structures 286, 300.

A second lens element is formed with an array of lens surfaces in a similar manner to the lens arrays for display apparatuses described above. In particular the second lens element comprises: a substrate 291; a surface relief structure 289, the front surface of which has a relief structure shaped as an array of lens surfaces; a low index material 295; a second lenticular array structure 288, the front surface of which has a relief structure shaped as an array of lens surfaces aligned by means of alignment features 293 to the structure 289; and a second substrate 290. The lens structures 289, 288 cooperate to image the light source formed by the projection lens 283 into the aperture of a mask array 292 through a substrate 290. Light then passes through a substrate 294 and onto a diffuser 296. In this way, frontal reflections from a projection screen can be reduced. The lens element 291, 289, 295, 288, 290 has the same optical power as a single lens in air, but has lower levels of scatter than for the prior art single lenticular projection screen, and thus show lower levels of Moiré beating and surface visibility than for standard lenticular screens. As the lens surface is less visible, it may be possible to remove the mask layer 292, thus reducing device cost. Further, the substrates 298 and 291 may advantageously be bonded together so as to further reduce Fresnel reflections within the device and increasing optical throughput.

In the example, both of the lens elements are of the low reflectivity type of the present invention; however in practice it may be beneficial to use just one of the elements with these features.

Figure 25A:
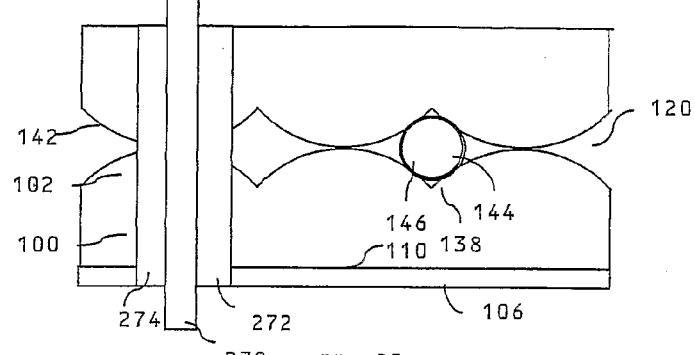
FIG. 25 shows a method to cut a lens array of the present invention.
Figure 25B:
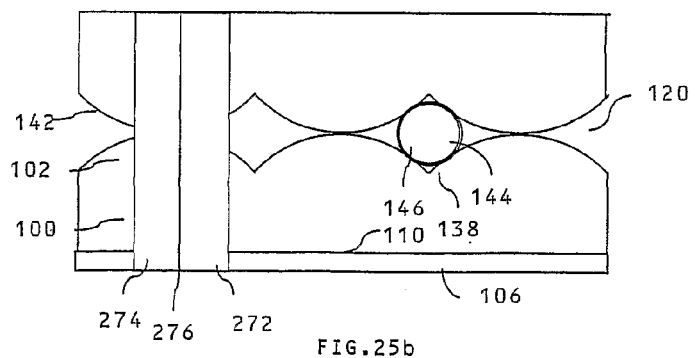
Figure 25C:
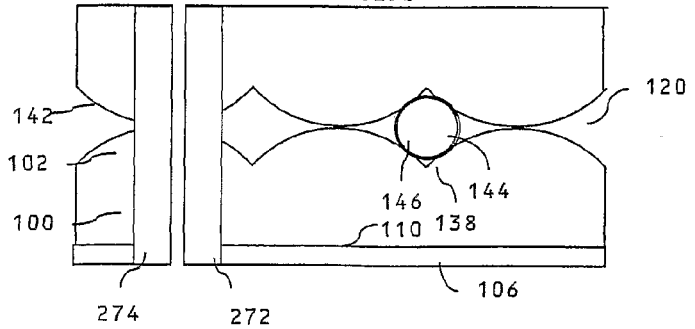

As shown in FIG. 25a, lens elements may be fabricated in large sheets and cut down by means of a heated cutting element 270 which may be a wire or a blade, in the case in which the polymer is a thermoplastic. The hot wire melts the plastic in regions 272 and 274 and as shown in FIG. 25b forms a relatively weak seal junction 276. Such a seal can be easily broken by mechanical stress to produced two separate parts as shown in FIG. 25c. A further adhesive seal can be applied after breaking the joint to improve mechanical durability of the part. The device may advantageously formed so that the finished element does not have the alignment features 144 in place. Such a lens element will not show visibility of any alignment feature, but maintains the alignment characteristics of the device. By overfilling the lens element with silicone oil, any residual air that enters the cell during cutting can be allowed to escape from the device during a storage or off-gassing cycle.

The invention claimed is:

1. A lens element comprising:
a rear substrate having a front surface provided with a surface relief having a plurality of zones each capable of providing a lens effect;
a front substrate disposed in front of the rear substrate and having a rear surface provided with a surface relief having a plurality of zones each capable of providing a lens effect, the zones of the surface relief provided on the rear substrate and the front substrate having the same spatial arrangement over the area of the lens element such that the zones of the surface relief provided on the rear substrate and the front substrate have an equivalent lens effect, wherein the surface relief of the rear substrate and the surface relief of the front subject are convex lens surface; and solid or liquid, isotropic, intermediate material disposed between the front surface of the rear substrate and the rear surface of the front substrate, the intermediate material having a refractive index lower than the refractive index of each of the rear substrate and the front substrate.

2. The lens element according to claim 1, further comprising alignment elements disposed within the intermediate material and contacting the front surface of the rear substrate and the rear surface of the front substrate.

3. The lens element according to claim 2, wherein the alignment elements are balls or fibers.

4. The lens element according to claim 2, wherein the alignment elements are adhesive or are coated in an adhesive by which adhesive the alignment elements being adhered to the lens surfaces.

5. The lens element according to claim 1, wherein the rear substrate and the front substrate have identical lens effects.

6. The lens element according to claim 1, wherein the front substrate has a thickness which is less than the thickness of the rear substrate.

7. The lens element according to claim 1, wherein the isotropic intermediate material is selected from the group consisting of water, oil, and a polymer.

8. The lens element according to claim 7, wherein the oil is a silicone oil.

9. The lens element according to claim 1, wherein at least one of the rear substrate and the front substrate has a planar rear surface.

10. The lens element according to claim 1, wherein the front surface of the rear substrate is provided with a surface relief shaped as an array of cylindrical lens surfaces, and the rear surface of the front substrate is provided with a surface relief shaped as an array of cylindrical lens surfaces aligned coaxially with the array of lens surfaces of the rear substrate.

11. The lens element according to claim 10, further comprising:
a directional printed image display apparatus comprising:
a plurality of printed images, successive strips of each image being interlaced with each other in a regular order; and
wherein, the lens element is disposed in front of the plurality of printed images, the arrays of lens surfaces of the rear substrate and the front substrate being cooperating to direct light from the plurality interlaced images into respective nominal viewing windows.

12. The lens element according to claim 11, wherein, in at least one area of the display apparatus, the front surface of the front substrate has printed thereon a single printed image extending across the entirety of the at least one area of the display apparatus.

13. The lens element according to claim 11, wherein, in at least one area of the display apparatus, the front surface of the rear substrate and the rear surface of the front substrate are each covered by a material having a refractive index matched to the refractive index of the respective substrate.

14. The lens element according to claim 11, wherein, in at least one area of the display apparatus, the front surface of the rear substrate and the rear surface of the front substrate are each modified to be planar.

15. The lens element according to claim 13, wherein said printed images are replaced by a single printed image extending across the entirety of the at least one area of the display apparatus.

16. The lens element according to claim 14, wherein said printed images are replaced by a single printed image extending across the entirety of the at least one area of the display apparatus.

17. The lens element according to claim 13, wherein said printed images are absent across the entirety of the at least one area of the display apparatus.

18. The lens element according to claim 14, wherein said printed images are absent across the entirety of the at least one area of the display apparatus.

19. The lens element according to claim 11, wherein the plurality of printed images are printed on the rear surface of the rear substrate.

20. The lens element according to claim 11, further comprising an image carrier substrate disposed behind the rear substrate, the plurality of printed images being printed on the image carrier substrate.

21. The lens element according to claim 20, further comprising a spacer layer intermediate the image carrier substrate and the rear surface of the rear substrate.

22. The lens element according to claim 11, wherein the printed images are reflective images or transparency images.

23. The lens element according to claim 10, further comprising:
a display apparatus, the display apparatus comprising:
a spatial light modulator having an array of pixels capable of displaying a plurality of images with successive strips of each image interlaced with each other in a regular order;
wherein the lens element is disposed in front of the spatial light modulator, the arrays of lens surfaces of the rear substrate and the front substrate cooperating to direct light from a plurality of interlaced images displayed on the spatial light modulator into respective nominal viewing windows.

24. The lens element according to claim 1, wherein both of the front surface of the rear substrate and the rear surface of the front substrate are provided with a surface relief shaped as a Fresnel lens.

25. The lens elements according to claim 24, further comprising:
a backlight apparatus for a display apparatus, the backlight apparatus comprising:
a light source; and
wherein the lens element is disposed in front of the light source.

26. The lens element according to claim 24, further comprising:
a projection display apparatus, the projection display apparatus comprising:
an image display apparatus;
a projection screen; and
a projection lens arranged to direct light onto the projection screen, wherein the projection screen comprises the lens element arranged to convert the image of the projection lens into substantially parallel rays.

27. The lens element according to claim 26, wherein the projection screen further comprises the lens element.

28. A method of manufacturing a lens element, the method comprising:
providing two substrates each having a surface provided with a surface relief having a plurality of zones each capable of providing a lens effect;

aligning the two substrates, with said surfaces provided with a surface relief facing one another and aligned coaxially, and with solid or liquid, isotropic, intermediate material disposed therebetween, the isotropic intermediate material having a refractive index lower than the refractive index of each of the two substrates, by arranging alignment elements within the isotropic intermediate material contacting the surfaces provided with a surface relief of each of the two substrates, and attaching the two substrates together.

29. The method according to claim 28, wherein the alignment elements are balls or fibers, and wherein during said step of aligning the two substrates the alignment fibres extend beyond the substrates, and the method further comprises, after attaching the two substrates together, pulling the alignment fibres and removing the alignment fibres from between the substrates.

30. The method according to claim 28, wherein the alignment elements are adhesive or are coated in an adhesive by which adhesive the alignment elements being adhered to the lens surfaces.

31. The method according to claim 28, wherein the isotropic intermediate material is selected from the group consisting of water, oil, and a polymer.

32. The method according to claim 31, wherein the oil is a silicone oil.

33. The method according to claim 28, wherein the front surface of the rear substrate is provided with a surface relief shaped as an array of cylindrical lens surfaces, and the rear surface of the front substrate is provided with a surface relief shaped as an array of cylindrical lens surfaces, and the alignment elements are arranged within the intermediate material contacting the lens surfaces of the array of each of the two substrates over the cusps between the lens surfaces.

34. The method according to claim 28, wherein both of the front surface of the rear substrate and the rear surface of the front substrate are provided with a surface relief shaped as a Fresnel lens.

35. A directional printed image display apparatus comprising:
- a plurality of printed images, successive strips of each image being interlaced with each other in a regular order;
- a rear substrate disposed in front of the printed images and having a front surface shaped to provide an array of convex lens surfaces;
- a front substrate disposed in front of the rear substrate and a rear surface shaped to provide an array of convex lens surfaces aligned coaxially with the array of lens surfaces of the rear substrate; and
- an isotropic intermediate material disposed between the array of lens surfaces of the rear substrate and the array of convex lens surfaces of the front substrate, the isotropic intermediate material having a refractive index lower than the refractive index of each of the rear substrate and the front substrate, the arrays of convex lens surfaces of the rear substrate and the front substrate cooperating to direct light from each image into a respective nominal viewing window.

36. A method of manufacturing a directional printed image display apparatus, the method comprising:
- providing two substrates each having a surface shaped to provide an array of convex lens surfaces;
- aligning the two substrates, with said surfaces shaped to provide an array of convex lens surfaces facing one another and aligned coaxially, and with an isotropic intermediate material disposed therebetween, the isotropic intermediate material having a refractive index lower than the refractive index of each of the two substrates, by arranging alignment elements within the intermediate material contacting the lens surfaces of the array of each of the two substrates over the cusps between lens surfaces, and attaching the two substrates together; and
- providing a plurality of printed images behind the two substrates with successive strips of each image being interlaced with each other in a regular order and with a strip of each image aligned with respective lenses of the two substrates.

37. A directional printed image display apparatus comprising:
- a plurality of printed images, successive strips of each image being interlaced with each other in a regular order;
- a rear substrate disposed in front of the printed images;
- a front substrate disposed in front of the rear substrate and having a planar front surface,
- the surface of at least one of the front substrate or the rear substrate, which surface faces the other of the front substrate or the rear substrate, being shaped to provide an array of convex lens surfaces which direct light from each image into a respective nominal viewing window; and
- an isotropic liquid contained between the rear substrate and the front substrate, the isotropic liquid having a refractive index which is lower than the refractive index of said one of the front substrate or the rear substrate and which is greater than the refractive index of air.

38. The directional printed image display apparatus according to claim 37, further comprising spacer elements disposed within the isotropic liquid and contacting the rear surface of the front substrate and the front surface of the rear substrate, the contact with said surface of said one of the front substrate or the rear substrate being over the cusps between lens surfaces.

39. The directional printed image display apparatus according to claim 37, wherein the surface of said one of the front substrate or the rear substrate, which surface faces said other of the front substrate or the rear substrate, is further provided with spacer protrusions which protrude beyond the lens surfaces and contact the surface of said other of the front substrate or the rear substrate, which surface faces said one of the front substrate or the rear substrate.

* * * * *